US012565358B2

(12) United States Patent
Luburic et al.

(10) Patent No.: US 12,565,358 B2
(45) Date of Patent: Mar. 3, 2026

(54) CONTAINER AND SEAL ASSEMBLY

(71) Applicant: BWAY CORPORATION, Atlanta, GA (US)

(72) Inventors: Frano Luburic, Costa Mesa, CA (US); John Homan, Naperville, IL (US)

(73) Assignee: BWAY CORPORATION, Oak Brook, IL (US)

( * ) Notice: Subject to any disclaimer, the term of this patent is extended or adjusted under 35 U.S.C. 154(b) by 0 days.

(21) Appl. No.: 17/288,015

(22) PCT Filed: Feb. 26, 2020

(86) PCT No.: PCT/US2020/019973

§ 371 (c)(1),
(2) Date: Apr. 23, 2021

(87) PCT Pub. No.: WO2020/176669

PCT Pub. Date: Sep. 3, 2020

(65) Prior Publication Data

US 2021/0403205 A1 Dec. 30, 2021

Related U.S. Application Data

(60) Provisional application No. 62/810,709, filed on Feb. 26, 2019.

(51) Int. Cl.

| | |
|---|---|
| ***B65D 43/02*** | (2006.01) |
| ***B44D 3/12*** | (2006.01) |
| ***B65D 21/02*** | (2006.01) |

(52) U.S. Cl.

CPC ....... *B65D 43/0208* (2013.01); *B65D 21/022* (2013.01); *B44D 3/127* (2013.01);

(Continued)

(58) Field of Classification Search

CPC ............. B65D 43/0208; B65D 21/022; B65D 2543/00092; B65D 2543/00222;

(Continued)

(56) References Cited

U.S. PATENT DOCUMENTS

| | | |
|---|---|---|
| 606,838 A | 7/1898 | Heins |
| 1,454,958 A | 5/1923 | Davis |

(Continued)

FOREIGN PATENT DOCUMENTS

| | | |
|---|---|---|
| CA | 1166190 A | 4/1984 |
| CA | 1189023 A | 6/1985 |

(Continued)

OTHER PUBLICATIONS

International Search Report and Written Opinion dated May 19, 2020 for International PCT Patent Application No. PCT/US20/019973.

(Continued)

*Primary Examiner* — Don M Anderson
*Assistant Examiner* — Eric C Baldrighi
(74) *Attorney, Agent, or Firm* — Michael Best & Friedrich LLP

(57) ABSTRACT

The present disclosure relates generally to containers and container lids. In at least one embodiment, the disclosed containers and container lids include an improved seal structure that forms a liquid-tight seal. For example, in certain embodiments, the improved seal structure is included on a built-in ring around the rim of the container. In some embodiments, the improved seal structure is included on a separate container ring for attaching to a container. In these embodiments, the contents of the container may be poured out of the container such that virtually no excess content is trapped in-between seams.

19 Claims, 16 Drawing Sheets

(52) U.S. Cl.
CPC .............. *B65D 2543/00092* (2013.01); *B65D 2543/00222* (2013.01); *B65D 2543/00277* (2013.01); *B65D 2543/00296* (2013.01); *B65D 2543/00564* (2013.01); *B65D 2543/00629* (2013.01); *B65D 2543/00685* (2013.01); *B65D 2543/00731* (2013.01); *B65D 2543/00796* (2013.01)

(58) Field of Classification Search
CPC ........... B65D 2543/00277; B65D 2543/00296; B65D 2543/00564; B65D 2543/00629; B65D 2543/00685; B65D 2543/00731; B65D 2543/00796; B44D 3/127
USPC .......................................................... 220/806
See application file for complete search history.

(56) References Cited

U.S. PATENT DOCUMENTS

| | | | | |
|---|---|---|---|---|
| 1,550,983 | A | 8/1925 | Pratt | |
| 1,696,240 | A | 12/1928 | Kircher, Jr. | |
| 1,759,274 | A * | 5/1930 | O'Brien | B65D 55/06 220/806 |
| 2,196,614 | A | 4/1940 | Spitz | |
| 2,611,508 | A | 9/1952 | Brown | |
| 2,885,108 | A | 5/1959 | Donoghue | |
| 3,080,090 | A | 3/1963 | Young | |
| 3,109,575 | A | 11/1963 | Aldington | |
| D207,356 | S | 4/1967 | McCormick | |
| 3,362,565 | A | 1/1968 | McCormick | |
| 3,696,962 | A | 10/1972 | Fehres et al. | |
| 3,799,388 | A | 3/1974 | Knize | |
| 3,814,277 | A | 6/1974 | La Croce et al. | |
| 3,913,785 | A | 10/1975 | Pattershall | |
| 3,944,115 | A * | 3/1976 | Moonan | B65D 43/0218 220/802 |
| 3,977,563 | A | 8/1976 | Holt | |
| 3,999,677 | A | 12/1976 | Oberkircher | |
| 4,022,344 | A | 5/1977 | Roamer | |
| 4,101,046 | A | 7/1978 | Puntillo | |
| 4,125,204 | A | 11/1978 | Klein | |
| 4,128,223 | A | 12/1978 | Brownlee | |
| 4,145,789 | A | 3/1979 | Morgan, Sr. | |
| 4,171,063 | A | 10/1979 | Cloutier | |
| 4,176,768 | A | 12/1979 | Ritter | |
| 4,210,258 | A | 7/1980 | von Holdt | |
| 4,228,916 | A | 10/1980 | Weingardt | |
| 4,245,753 | A | 1/1981 | Ellis | |
| 4,256,240 | A | 3/1981 | Woinarski | |
| 4,279,358 | A | 7/1981 | Jacobs | |
| 4,293,080 | A | 10/1981 | Letica | |
| 4,308,970 | A | 1/1982 | Von Holdt | |
| 4,353,476 | A | 10/1982 | Cowgill | |
| 4,356,930 | A | 11/1982 | Roper | |
| 4,375,948 | A | 3/1983 | von Holdt | |
| 4,378,895 | A | 4/1983 | Woinarski | |
| 4,387,828 | A | 6/1983 | Yates, Jr. | |
| 4,388,998 | A | 6/1983 | Underwood et al. | |
| 4,397,404 | A * | 8/1983 | Blanchette | B65D 43/0206 206/508 |
| 4,446,986 | A | 5/1984 | Bowen | |
| 4,453,646 | A | 6/1984 | Harrild | |
| 4,458,825 | A | 7/1984 | Holota | |
| D277,646 | S | 2/1985 | Jorgensen | |
| D278,561 | S | 4/1985 | Anderson | |
| 4,512,493 | A | 4/1985 | Von Holdt | |
| 4,512,494 | A | 4/1985 | Von Holdt | |
| D278,800 | S | 5/1985 | Bowen | |
| 4,518,094 | A | 5/1985 | Kodman | |
| 4,518,097 | A | 5/1985 | Milton | |
| 4,524,882 | A | 6/1985 | Buc | |
| 4,530,442 | A | 7/1985 | Vogel, Jr. | |
| D280,038 | S | 8/1985 | Anderson | |
| 4,606,474 | A | 8/1986 | Dudzik | |
| 4,667,843 | A | 5/1987 | Galer | |
| 4,674,644 | A * | 6/1987 | Jacobs | B65D 43/0212 215/320 |
| D296,421 | S | 6/1988 | Rayner | |
| D296,422 | S | 6/1988 | Rayner | |
| D296,423 | S | 6/1988 | Rayner | |
| D296,987 | S | 8/1988 | Rayner | |
| 4,796,775 | A | 1/1989 | Dudzik | |
| 4,799,603 | A | 1/1989 | Dudzik | |
| 4,823,433 | A | 4/1989 | Curtis | |
| 4,867,401 | A | 9/1989 | Graff | |
| 4,887,735 | A | 12/1989 | Dudzik | |
| 4,893,725 | A | 1/1990 | Ball | |
| 4,895,269 | A | 1/1990 | Cade | |
| 4,928,846 | A | 5/1990 | Murrin, Jr. | |
| D310,628 | S | 9/1990 | Rayner | |
| D312,157 | S | 11/1990 | Sjolander | |
| 4,969,570 | A | 11/1990 | Harvey, Sr. | |
| D312,572 | S | 12/1990 | Rayner | |
| 4,998,643 | A | 3/1991 | Pradel | |
| 5,027,973 | A | 7/1991 | Drogos | |
| 5,092,481 | A | 3/1992 | Skelton | |
| 5,097,977 | A | 3/1992 | Straub | |
| 5,125,530 | A | 6/1992 | Straub | |
| D329,597 | S | 9/1992 | Gallagher | |
| 5,143,219 | A | 9/1992 | Yates | |
| 5,149,238 | A | 9/1992 | McEldowney | |
| 5,161,689 | A | 11/1992 | Balson | |
| 5,172,822 | A | 12/1992 | Defrance | |
| 5,181,626 | A | 1/1993 | Daenen | |
| 5,186,329 | A | 2/1993 | Fogelberg | |
| D338,621 | S | 8/1993 | Balson | |
| D339,621 | S | 9/1993 | Briden | |
| 5,251,781 | A | 10/1993 | Skelton | |
| 5,261,551 | A | 11/1993 | Watt | |
| 5,307,949 | A | 5/1994 | Von Holdt, Jr. | |
| 5,406,668 | A | 4/1995 | Goodhue | |
| 5,437,386 | A * | 8/1995 | Von Holdt | B65D 43/0212 220/268 |
| 5,471,681 | A | 12/1995 | Ferrini | |
| 5,494,352 | A | 2/1996 | L'Estrange, Jr. | |
| 5,566,465 | A | 10/1996 | Zoeliner | |
| 5,626,258 | A | 5/1997 | Maiorino | |
| 5,626,319 | A | 5/1997 | Fusillo | |
| D380,434 | S | 7/1997 | Chen | |
| 5,716,034 | A | 2/1998 | Unkefer | |
| 5,806,709 | A | 9/1998 | Marshall | |
| 5,967,363 | A | 10/1999 | Allen | |
| 6,006,942 | A | 12/1999 | Morris, Sr. et al. | |
| 6,098,833 | A | 8/2000 | von Holdt | |
| 6,170,691 | B1 | 1/2001 | Morris, Sr. et al. | |
| 6,179,158 | B1 | 1/2001 | Koda | |
| 6,189,725 | B1 | 2/2001 | Monico | |
| 6,244,559 | B1 | 6/2001 | Stanton | |
| 6,245,277 | B1 | 6/2001 | Diamond | |
| 6,250,494 | B1 | 6/2001 | Diamond | |
| 6,322,028 | B1 | 11/2001 | Fleckenstein | |
| D457,283 | S | 5/2002 | Wayt | |
| 6,386,013 | B1 | 5/2002 | Werth | |
| 6,436,286 | B1 | 8/2002 | Scott | |
| 6,460,723 | B2 | 10/2002 | Nguyen | |
| 6,491,185 | B1 | 12/2002 | Azzarello | |
| 6,588,618 | B1 | 7/2003 | Davis | |
| D485,404 | S | 1/2004 | Del Prato | |
| 6,761,280 | B2 | 7/2004 | Zonker | |
| D498,339 | S | 11/2004 | Doelling | |
| 6,820,848 | B1 | 11/2004 | Adam | |
| 6,964,348 | B2 | 11/2005 | Breimon | |
| D534,253 | S | 12/2006 | Sandman | |
| D537,598 | S | 2/2007 | Moore | |
| D548,393 | S | 8/2007 | Smith | |
| D558,419 | S | 12/2007 | Zychlinski | |
| D610,856 | S | 3/2010 | Hoffman et al. | |
| D633,991 | S | 3/2011 | Nakagawa | |
| D638,523 | S | 5/2011 | Yoshida | |
| D644,803 | S | 9/2011 | Schmon et al. | |
| D655,401 | S | 3/2012 | Muramatsu | |
| D659,334 | S | 5/2012 | Runyons | |
| 8,181,819 | B2 | 5/2012 | Burney et al. | |

(56) References Cited

U.S. PATENT DOCUMENTS

| | | | | |
|---|---|---|---|---|
| D665,491 | S | 8/2012 | Goel | |
| 8,342,354 | B2 * | 1/2013 | Letica | B65D 43/0212 206/508 |
| D703,898 | S | 4/2014 | Neu | |
| 8,695,846 | B2 | 4/2014 | Letica | |
| D723,239 | S | 2/2015 | Raschke | |
| 8,985,383 | B2 | 3/2015 | Campbell | |
| D728,757 | S | 5/2015 | Graham | |
| 9,085,404 | B2 | 7/2015 | Dunn | |
| D743,513 | S | 11/2015 | Yamagishi | |
| D751,380 | S | 3/2016 | Torrison | |
| D751,381 | S | 3/2016 | Torrison | |
| D751,382 | S | 3/2016 | Torrison | |
| D751,383 | S | 3/2016 | Torrison | |
| 9,382,048 | B2 | 7/2016 | Van De Klippe | |
| D766,534 | S | 9/2016 | Stravitz | |
| D767,234 | S | 9/2016 | Kirkland | |
| D767,329 | S | 9/2016 | Mock | |
| D774,887 | S | 12/2016 | Torrison et al. | |
| D776,529 | S | 1/2017 | Torrison et al. | |
| 9,573,183 | B2 | 2/2017 | Mcclung | |
| D783,922 | S | 4/2017 | Kirkland | |
| 9,662,929 | B2 | 5/2017 | Smith | |
| 9,694,972 | B1 | 7/2017 | Stravitz | |
| 9,834,376 | B1 | 12/2017 | Stravitz | |
| D813,483 | S | 3/2018 | Foss et al. | |
| D814,317 | S | 4/2018 | Ehrlich et al. | |
| D816,500 | S | 5/2018 | Torrison et al. | |
| D828,753 | S | 9/2018 | Zabaleta | |
| D830,434 | S | 10/2018 | Wakisaka et al. | |
| D830,435 | S | 10/2018 | Wakisaka | |
| D836,873 | S | 12/2018 | Schneider | |
| D844,921 | S | 4/2019 | Schneider | |
| 10,543,964 | B2 | 1/2020 | Mortensen | |
| D888,903 | S | 6/2020 | Gunther | |
| D891,174 | S | 7/2020 | Cheng | |
| D896,353 | S | 9/2020 | Nakagawa | |
| D914,870 | S | 3/2021 | Zhang et al. | |
| D916,590 | S | 4/2021 | Albright | |
| D917,281 | S | 4/2021 | Will et al. | |
| D917,282 | S | 4/2021 | Albright et al. | |
| D917,283 | S | 4/2021 | Albright et al. | |
| D917,284 | S | 4/2021 | Albright et al. | |
| D917,825 | S | 4/2021 | Kirkland | |
| D918,515 | S | 5/2021 | Xie | |
| D932,721 | S | 10/2021 | Luburic et al. | |
| D932,893 | S | 10/2021 | Van De Klippe | |
| D933,324 | S | 10/2021 | Luburic et al. | |
| D941,544 | S | 1/2022 | Luburic et al. | |
| D942,724 | S | 2/2022 | Luburic et al. | |
| 2002/0175172 | A1 | 11/2002 | Diesterbeck | |
| 2003/0168465 | A1 | 9/2003 | Breimon et al. | |
| 2004/0173718 | A1 | 9/2004 | Song | |
| 2005/0016887 | A1 | 1/2005 | Yewdall et al. | |
| 2005/0133517 | A1 | 6/2005 | Jackson | |
| 2005/0133518 | A1 | 6/2005 | Chornenky | |
| 2006/0043095 | A1 | 3/2006 | Maholm | |
| 2006/0113310 | A1 | 6/2006 | Hawkins | |
| 2006/0243733 | A1 | 11/2006 | Kline et al. | |
| 2006/0243736 | A1 | 11/2006 | Kline et al. | |
| 2006/0261067 | A1 * | 11/2006 | Letica | B65D 43/0212 220/780 |
| 2007/0221531 | A1 | 9/2007 | Coughlin | |
| 2007/0221675 | A1 | 9/2007 | Bootz | |
| 2008/0017651 | A1 | 1/2008 | Walker et al. | |
| 2008/0185383 | A1 | 8/2008 | Philippe | |
| 2008/0190803 | A1 | 8/2008 | Blumenschein | |
| 2008/0272133 | A1 | 11/2008 | Chornenky | |
| 2009/0032542 | A1 | 2/2009 | Temple | |
| 2009/0314780 | A1 | 12/2009 | Selina et al. | |
| 2010/0108705 | A1 | 5/2010 | De Jesus | |
| 2010/0229689 | A1 | 9/2010 | Minnette | |
| 2011/0000912 | A1 | 1/2011 | Roeterdink | |
| 2011/0036843 | A1 | 2/2011 | Letica | |
| 2011/0186572 | A1 | 8/2011 | Ciccone et al. | |
| 2013/0048657 | A1 | 2/2013 | Heiser, Jr. | |
| 2013/0075413 | A1 | 3/2013 | Letica | |
| 2013/0098925 | A1 | 4/2013 | Dunwoody | |
| 2013/0146609 | A1 | 6/2013 | Campbell | |
| 2013/0182526 | A1 | 7/2013 | Dertina, Sr. | |
| 2013/0341342 | A1 | 12/2013 | Campbell | |
| 2014/0076899 | A1 | 3/2014 | Ciccone | |
| 2014/0263304 | A1 | 9/2014 | Guertin | |
| 2015/0102034 | A1 | 4/2015 | Hutt | |
| 2016/0280423 | A1 | 9/2016 | Luburic | |
| 2016/0311584 | A1 | 10/2016 | Van Oosten | |
| 2017/0253415 | A1 | 9/2017 | Schneider | |
| 2017/0313477 | A1 * | 11/2017 | Slack | B65D 53/00 |
| 2019/0283938 | A1 | 9/2019 | Strachan | |
| 2020/0016923 | A1 | 1/2020 | Lewan | |
| 2021/0031558 | A1 | 2/2021 | Mazur | |
| 2022/0024652 | A1 | 1/2022 | Luburic et al. | |
| 2022/0363090 | A1 | 11/2022 | Lewan | |
| 2023/0105295 | A1 | 4/2023 | Simmons | |

FOREIGN PATENT DOCUMENTS

| | | | | |
|---|---|---|---|---|
| CA | 2383732 | A1 | 10/2002 | |
| CA | 3045111 | A1 | 5/2018 | |
| CN | 1094368 | A * | 11/1994 | B65D 43/0241 |
| CN | 1118325 | A | 3/1996 | |
| CN | 1422224 | A | 6/2003 | |
| CN | 104540745 | A | 4/2015 | |
| DE | 20206170 | U1 | 8/2002 | |
| EP | 0132897 | A2 | 2/1985 | |
| EP | 0278581 | A2 | 8/1988 | |
| EP | 0455172 | | 4/1991 | |
| EP | 0455172 | A2 | 11/1991 | |
| EP | 0736460 | A1 | 10/1996 | |
| FR | 2702419 | A1 | 9/1994 | |
| GB | 522566 | A | 6/1940 | |
| GB | 0724913 | | 1/2008 | |
| GB | 2445109 | A | 6/2008 | |
| NO | 146806 | B | 9/1982 | |
| WO | 8805015 | A1 | 7/1988 | |
| WO | WO-2004002845 | A1 * | 1/2004 | B65D 43/0204 |
| WO | 2016075458 | A1 | 5/2016 | |
| WO | 2018030963 | A1 | 2/2018 | |
| WO | 2018098454 | A1 | 5/2018 | |

OTHER PUBLICATIONS

International Search Report and Written Opinion dated May 22, 2020 for International PCT Patent Application No. PCT/US20/019975.

Plastic Paint Can; http://www.thecarycompany.com/plastic-paint-cans-30wkpb?utm_source=google_shopping&gclid=EAIaIQobChMi_cjGk9Hq8AIVEv2zCh1J_AwHEAQYAiABEglod7_D_BwE (Year: 2019).

Black Paint Can; http://www.amazon.com/Gallon-Plastic-All-Plastic-Snap-tight-Varnishes/dp/B075NMJ39V (Year: 2018).

Container Rings; http://topwillgroup.com/stainless-steel-container-rings-products/ (Year: 2021).

International Search Report and Written Opinion issued in International application No. PCT/US2020/019973, mailed May 19, 2020.

International Search Report and Written Opinion issued in International application No. PCT/US20/019975, mailed May 22, 2020.

Extended European Search Report for European Application No. 20200762889, mailed Sep. 12, 2023, 8 Pages.

Final Office Action for U.S. Appl. No. 17/288,017, mailed Sep. 20, 2023, 18 Pages.

Non-Final Office Action for U.S. Appl. No. 17/449,923, mailed Sep. 20, 2023, 24 Pages.

Notice of Allowance for U.S. Appl. No. 29/789,610, mailed Sep. 19, 2023, 6 Pages.

Extended European Search Report for European Application No. 20762404.0, mailed Dec. 12, 2022, 7 Pages.

International Preliminary Report on Patentability for International Application No. PCT/US2020/019973, mailed Sep. 10, 2021, 8 Pages.

(56) References Cited

OTHER PUBLICATIONS

International Preliminary Report on Patentability for International Application No. PCT/US2020/019975, mailed Sep. 10, 2021, 9 Pages.
Notice of Allowance for U.S. Appl. No. 29/789,609, mailed Aug. 22, 2023, 06 Pages.
Final Office Action for U.S. Appl. No. 17/449,923, mailed Apr. 10, 2024, 31 Pages.
Non-Final Office Action for U.S. Appl. No. 17/288,017, mailed Apr. 16, 2024, 21 Pages.
Notice of Allowance for U.S. Appl. No. 29/789,610, mailed Oct. 17, 2023, 3 Pages.
Australian Patent Office. Examination Report No. 1 for Application No. 2020229837, dated Feb. 25, 2025 (3 pages).
Australian Patent Office. Examination Report No. 1 for Application No. 2020229829, dated Feb. 25, 2025 (4 pages).
European Patent Office. Extended European Search Report for Application No. 24217149.4, dated Apr. 29, 2025 (9 pages).
Brazilian Patent Office. Technical Examination Report for Application No. BR112021016441-3, dated May 6, 2025 (8 pages with machine translation).
Malaysian Patent Office, Office Action and Search Report for Application No. PI2021004577, dated Jun. 5, 2025 (7 pages).
Mexican Patent Office. Office Action for Application No. MX/a/2021/010038, dated Oct. 21, 2025 (18 pages with machine translation).
Malaysian Patent Office, Office Action for Application No. PI2021004577, dated Dec. 22, 2025 (4 pages).

* cited by examiner

CONTAINER AND SEAL ASSEMBLY

CROSS REFERENCE TO RELATED APPLICATIONS

This application is a 371 National Stage Application of International Patent Application No. PCT/US20/19973, filed on Feb. 26, 2020, and entitled "Container and Seal Assembly," which claims priority to, the benefit under 35 U.S.C. § 119 of, and incorporates by reference herein in its entirety U.S. Provisional Patent Application No. 62/810,709, filed Feb. 26, 2019, and entitled "TWO PIECE CONTAINER."

This application is related to and hereby incorporates by reference the following U.S. and international (PCT) patent applications:

International (PCT) Patent Application No. PCT/US20/19975, entitled "IMPROVED THREE-PIECE CONTAINER ASSEMBLY," filed on Feb. 26, 2020;

U.S. Design patent application Ser. No. 29/725,732, entitled "CONTAINER," filed on Feb. 26, 2020;

U.S. Design patent application Ser. No. 29/725,733, entitled "CONTAINER," filed on Feb. 26, 2020;

U.S. Design patent application Ser. No. 29/725,734, entitled "CONTAINER RING," filed on Feb. 26, 2020; and U.S. Design patent application Ser. No. 29/725,731, entitled "CONTAINER LID," filed on Feb. 26, 2020.

TECHNICAL FIELD

The present disclosure relates generally to containers and container lids.

BACKGROUND

Containers are a widely used component in a variety of industries. Wholesalers, merchants, and individuals use containers in a plethora of industries including, but not limited to: manufacturing, agriculture, beverage, entertainment, health care, food services, hospitality, fishing, retail, automotive, transportation, waste management, oil and gas, education, and construction. The paint industry in particular, as a liquid-based industry, heavily depends on containers for the majority of its packing, storing, and shipping requirements. As such, improvements to paint and other liquid-carrying containers may account for significant cost savings to a company's bottom line.

As an initial matter, containers and lids can include inadequate sealing mechanisms that allow leakage and air intake. Further, in some applications, traditional three piece containers (typically including a metal seal ring) tend to permit waste, as paint or other liquids often become trapped in various joints or seams of the container. Therefore, there is a long-felt but unresolved need for containers and lids, having a design that provides an improved sealing structure that provides a liquid-tight seal and limits the amount of product that may become trapped in various joints or seams of the container.

BRIEF SUMMARY OF DISCLOSURE

Briefly described and according to one embodiment, aspects of the present disclosure relate generally to all-plastic containers and container lids, and more particularly to containers with improved seal structures and designs that help eliminate build-up of material in seams and the like. The present disclosure discusses a novel and unique container that provides several improvements over existing, traditional containers in the paint and other liquid-based industries. In various embodiments, the containers discussed herein increase product retention and are lower cost than traditional containers for storing similar goods. In at least one embodiment, the containers discussed herein includes an integrally formed ring with an improved seal structure, which may eliminate one or more seams within the container. In particular embodiments, the containers discussed herein include a separate seal ring that helps eliminate seams and includes an improved seal structure. In these embodiments (and others), the present container may prevent product stored therein from being trapped in the one or more seams. For example, in at least one embodiment, the present container allows a consumer to pour substantially all paint/content out of the container such that no paint/content is left trapped within a joint or seam. As will be understood, a design that allows a consumer/user to substantially pour out all paint/content may make such a container easier and/or less expensive to recycle.

Additionally, in particular embodiments, and as will be discussed herein, the present container is manufactured from plastic, as opposed to traditional containers manufactured from metal, such that production expenses may be decreased and container longevity may be increased.

According to a first aspect, the container may include a seal structure including: A) an inner sidewall including: 1) an inner seal surface; 2) a substantially flat outer seal surface; and 3) a ring bead integrally formed with the inner seal surface and extending from the inner seal surface toward an outer sidewall interior surface for engaging with a corresponding structure on a container lid; and an outer sidewall including: 1) the outer sidewall interior surface; 2) a substantially flat outer sidewall exterior surface substantially parallel to the substantially flat outer seal surface and terminating in a container bead; and 3) a top surface of the container bead substantially perpendicular to the substantially flat outer sidewall exterior surface; and a floor including a downward slope from the inner sidewall to the outer sidewall.

According to a second aspect, the container may include the container of the first aspect or any other aspect, wherein the ring bead includes an upper ring bead slope and a lower ring bead slope, the upper ring bead slope and lower ring bead slope culminating in a ring bead peak.

According to a third aspect, the container may include the container of the second aspect or any other aspect, wherein the upper ring bead slope includes a slope steeper than the lower ring bead slope.

According to a fourth aspect, the container may include the container of the first aspect or any other aspect, wherein the top surface of the container bead slopes downwardly to form a protrusion extending inwardly from the outer sidewall interior surface toward the inner seal surface.

According to a fifth aspect, the container may include the container of the fourth aspect or any other aspect, wherein the container bead includes a bottom surface within a particular plane, and a peak of the protrusion extending inwardly from the outer sidewall interior surface is substantially in the particular plane.

According to a sixth aspect, the container may include the container of the first aspect or any other aspect, wherein the inner seal surface and the substantially flat outer seal surface converge at a seal surface peak.

According to a seventh aspect, the container may include the container of the sixth aspect or any other aspect, wherein the seal surface peak is substantially rounded.

According to an eighth aspect, the container may include the container of the sixth aspect or any other aspect, wherein the seal surface peak is substantially triangular.

According to a ninth aspect, the container may include the container of the sixth aspect or any other aspect, wherein the seal surface peak is substantially rectangular.

According to a tenth aspect, the container may include the container of the ninth aspect or any other aspect, wherein the substantially rectangular seal surface peak includes a top surface in a specific plane, and the top surface of the container bead is in the specific plane.

According to an eleventh aspect, the container may include the container of the first aspect or any other aspect, wherein the substantially flat outer seal surface includes a seal ring notch for receiving a correspondingly shaped structure on the container lid.

According to a twelfth aspect, the container may include the container of the eleventh aspect or any other aspect, wherein the seal ring notch is positioned substantially opposite the ring bead.

According to a thirteenth aspect, the container may include the container of the twelfth aspect or any other aspect, wherein the seal ring notch is substantially triangular, rectangular, or rounded.

According to a fourteenth aspect, the container may include the container of the first aspect or any other aspect, wherein the container includes the container lid engaged with the ring bead.

According to a fifteenth aspect, the container may include the container of the fourteenth aspect or any other aspect, wherein the container lid includes a substantially u-shaped channel including a container lid undercut engaged with the ring bead.

According to a sixteenth aspect, the container may include the container of the fifteenth aspect or any other aspect, wherein the container lid substantially u-shaped channel includes a seal ring engaged with a corresponding seal ring notch defined by the substantially flat outer seal surface.

According to a seventeenth aspect, the container may include the container of the fifteenth aspect or any other aspect, wherein the container lid includes a ledge.

According to an eighteenth aspect, the container may include the container of the first aspect or any other aspect, wherein the container includes a bottom, and an external wall extending from the bottom and defining an interior cavity.

According to a nineteenth aspect, the container may include the container of the eighteenth aspect or any other aspect, wherein the seal structure is integrally formed with the external wall.

According to a twentieth aspect, the container may include the container of the nineteenth aspect or any other aspect, wherein the seal structure and the container sidewall include plastic.

According to a twenty-first aspect, the container may include the container of the eighteenth aspect or any other aspect, wherein the container includes a seal ring coupled to the external wall, the seal ring including the seal structure.

According to a twenty-second aspect, the container may include the container of the twenty-first aspect or any other aspect, wherein the seal ring includes: A) an outer seal ring sidewall including a substantially arcuate portion for interfacing with a corresponding semi-circular bead of the external wall of the container; and B) a generally hook-shaped aperture formed by the outer sidewall including an undercut surface interfacing with a latch surface formed by the external wall of the container; and C) an inner seal ring sidewall forming the seal structure for sealing the interior cavity of the container with the container lid.

These and other aspects, features, and benefits of the claimed embodiment(s) will become apparent from the following detailed written description of the embodiments and aspects taken in conjunction with the following drawings, although variations and modifications thereto may be effected without departing from the spirit and scope of the novel concepts of the disclosure.

BRIEF DESCRIPTION OF THE DRAWINGS

The accompanying drawings illustrate one or more embodiments and/or aspects of the disclosure and, together with the written description, serve to explain the principles of the disclosure. Wherever possible, the same reference numbers are used throughout the drawings to refer to the same or like elements of an embodiment, and wherein.

DETAILED DESCRIPTION

Figure 1:
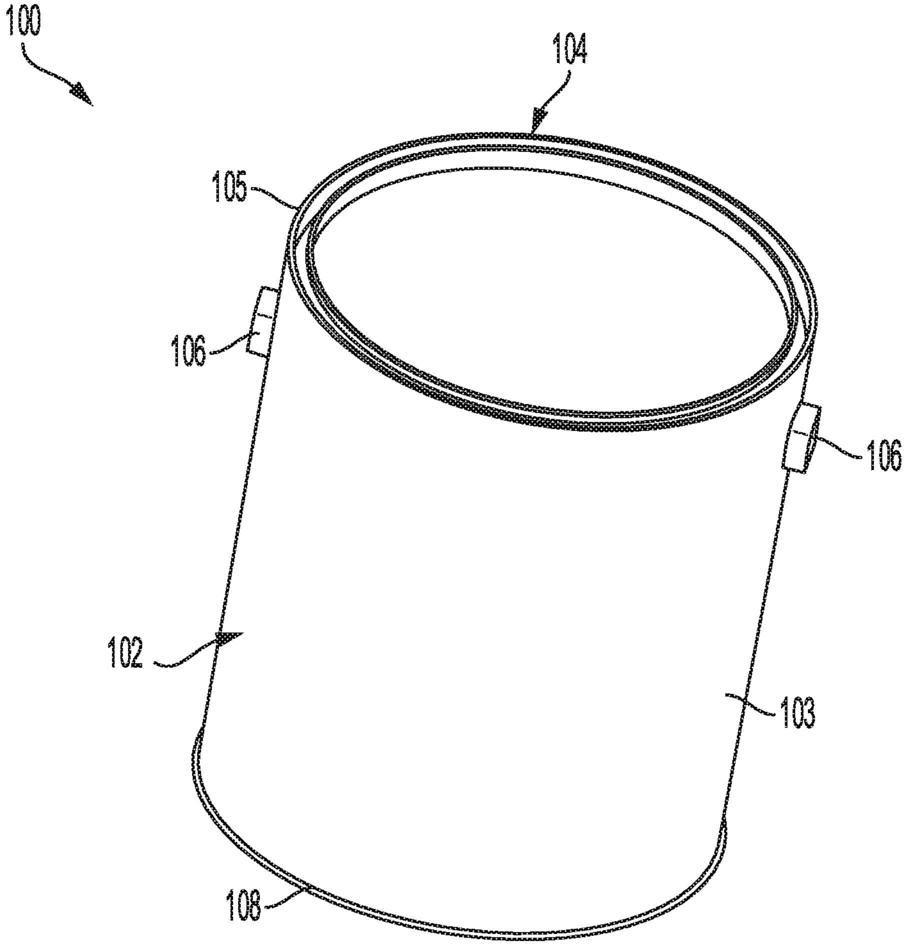
FIG. 1 is a perspective view of an exemplary container, according to one embodiment of the present disclosure.

For the purpose of promoting an understanding of the principles of the present disclosure, reference will now be made to the embodiments illustrated in the drawings and specific language will be used to describe the same. It will, nevertheless, be understood that no limitation of the scope of the disclosure is thereby intended; any alterations and further modifications of the described or illustrated embodiments, and any further applications of the principles of the disclosure as illustrated therein are contemplated as would normally occur to one skilled in the art to which the disclosure relates. All limitations of scope should be determined in accordance with, and as expressed in the claims.

Whether a term is capitalized is not considered definitive or limiting of the meaning of a term. As used in this document, a capitalized term shall have the same meaning as an uncapitalized term, unless the context of the usage specifically indicates that a more restrictive meaning for the capitalized term is intended. However, the capitalization or lack thereof within the remainder of this document is not intended to be necessarily limiting unless the context clearly indicates that such limitation is intended.

Overview

The above and further features of the disclosed exemplary container and container lid will be recognized from the following detailed descriptions and drawings of particular embodiments. In various embodiments, a container with an improved seal surface is disclosed. As will be understood from discussion herein, in at least one embodiment, the container includes the improved seal surface as part of a built-in ring (e.g., a two piece all plastic container). In certain embodiments, the container includes the improved seal surface as part of a seal ring that attaches to a container (e.g., a three-piece all plastic container).

In particular embodiments, the seal structure of the container includes one or more seal surfaces to provide enhanced sealing properties when sealed with a container lid. In at least one embodiment, the seal structure of the container includes a ring bead for engaging with a corresponding structure on the container lid, facilitating a liquid-tight seal. In certain embodiments, the seal structure of the container includes a container bead to provide increased sealing properties and to provide strength and support to the body of the container.

In at least one embodiment, a container ring (also described herein as a seal ring) is disclosed for engaging with a container and container lid. In some embodiments, the container ring includes a u-shaped channel with one or more sidewalls including one or more seal surfaces for facilitating a liquid-tight seal when engaged with a container and/or container lid. In further embodiments, the container includes a u-shaped channel with one or more sidewalls including one or more seal surfaces built into (e.g., integrally formed with) a sidewall of the container. As will be understood from discussions herein, the container/seal ring and the container forms a vertical seal (e.g., when the container is upright; substantially parallel to a sidewall of the container), which is unlikely to store or trap product stored within the container because gravity will help pull any material within the vertical seal downward and out of the seal.

Furthermore, in various embodiments, the container includes a container lid with a u-shaped channel. In particular embodiments, the container lid includes a ledge to provide support when opening a sealed container. In certain embodiments, the ledge may facilitate container nesting (e.g., stacking). In some embodiments, the container lid includes one or more seal surfaces to provide enhanced sealing properties when sealing a container (with or without a container ring). In particular embodiments, the container lid includes an indentation and an undercut for engaging with a corresponding ring bead on a container to facilitate a liquid-tight seal. In some embodiments, the container lid includes lead-in features to facilitate acceptance of a built-in ring of a container. In certain embodiments, the container lid includes a seal ring for engaging with a corresponding notch on a container to provide enhanced sealing properties. In one embodiment, the container lid includes a nest feature to facilitate stacking (e.g., nesting) of multiple container lids.

In one or more embodiments, the container lid may be manufactured to fit any container shape (e.g., rectangular, ovoid, etc.). According to at least one embodiment, the container lid is circular in shape. In at least one embodiment, the container lid is square in shape.

In particular embodiments, the container includes a decoration area (e.g., container body) that forms the outer casing of the container. In some embodiments, the container includes bail ear assemblies to provide a mechanism for attaching a handle to the container. In certain embodiments, the container includes a bottom panel to provide stability and support for the container as well as an encasing for material stored in the container. According to at least one embodiment, the container is circular in shape. In at least one embodiment, the container is square or rectangular in shape.

The container, container ring, and container lid discussed herein may be formed in any suitable way. In various embodiments, the container, container ring, and container lid are formed by injection molding. In particular embodiments, the container, container ring, and container lid are 3D printed or created via other additive manufacturing technique. In further embodiments, various components of the container, container ring, and container lid are formed or created separately, and the various components of the container, container ring, and container lid are joined or otherwise suitably connected to form the container, container ring, and container lid. In one embodiment, the container, container ring, and container lid may each be one piece and unitary.

In some embodiments, the container, container ring, and container lid may be formed from any suitable material or materials for storing or transporting such materials. In various embodiments, the container, container ring, and container lid are manufactured from metal or composite material. In particular embodiments, the container, container ring, and container lid are manufactured from plastic (e.g., Polyethylene, High-Density Polyethylene, etc.).

As will be understood by one of ordinary skill in the art, the container, container ring, and container lid discussed herein may be used for storing and sealing any variety of materials, including, but not limited to: paints, oils, food, consumer goods, construction materials, inks, chemicals, lubricants, adhesives, coatings, roofing mastics, driveway sealers, flavorings, sanitation supplies, building products, ice melt compounds, powders, pet food, and other such materials.

Exemplary Embodiments

Exemplary Container with Built-In Ring

Turning now to FIG. 1, a perspective view of an exemplary container 100 is shown, according to one embodiment of the present disclosure. According to at least one embodiment, the container 100 is substantially circular in shape. In particular embodiments, the container 100 may be rectangular or square in shape. In some embodiments, the container is manufactured out of plastic (e.g., Polyethylene, Polyethylene Terephthalate (PET), High-Density Polyethylene (HDPE), Polyvinyl Chloride (PVC), Low-Density Polyethylene (LDPE), Polypropylene (PP), Polystyrene (PP), etc.).

In various embodiments, the exemplary container 100 shown in FIG. 1 includes a body 102 (e.g., external wall 103). In one or more embodiments, the body 102 terminates with an integrally formed structure (e.g., built-in ring 104) at an open end. In particular embodiments, and as will be further described herein, the built-in ring 104 (e.g., integrally formed structure) includes a seal structure 105 around the circumference of the open end. In some embodiments, and as will be further described herein, a container lid (e.g., a plug) includes a corresponding seal structure, that may align and engage with the seal structure 105 (including an inner sidewall) of the built-in ring 104 to provide a liquid-tight seal when pressed together.

Additionally, in the embodiment shown in FIG. 1, plastic bail ears 106 are included on the external wall 103 of the container body 102, such that a handle may be attached to the container 100 to facilitate carrying or lifting of the container. In various embodiments, the bail ears 106 may be circular, pentagonal, rectangular, or any suitable shape. In particular embodiments, the bail ears 106 may be affixed to the external wall 103 of the container body 102, or, in one or more embodiments, the bail ears 106 may be an integral component of external wall 103 of the container body 102.

In certain embodiments, the container 100 may include a decoration area (e.g., external wall 103), whereby textual, graphical, and other suitable visual information may be displayed. In certain embodiments, the container 100 includes a container bottom 108 to provide stability and support for the container 100.

Figure 2C:
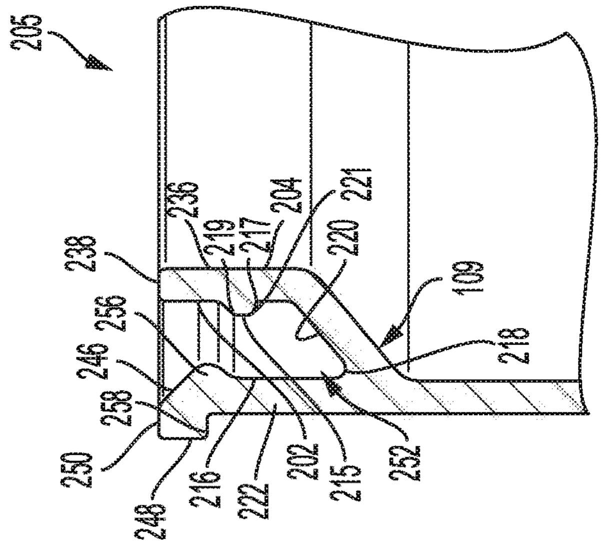
FIGS. 2A, 2B, and 2C are cross-sectional views of an exemplary container, according to embodiments of the present disclosure.
Figure 2B:
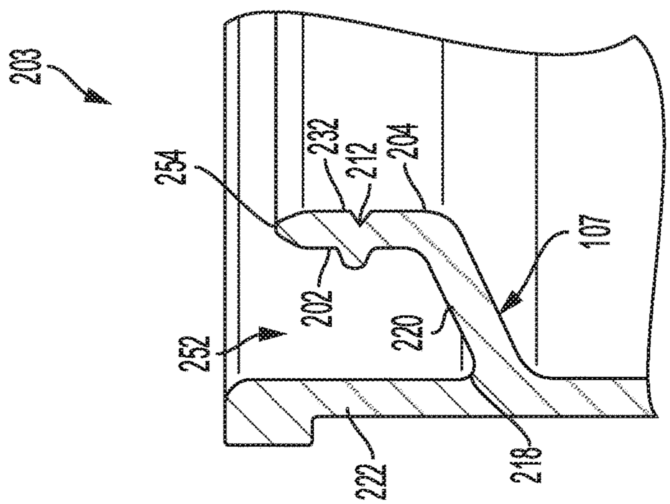
Figure 2A:
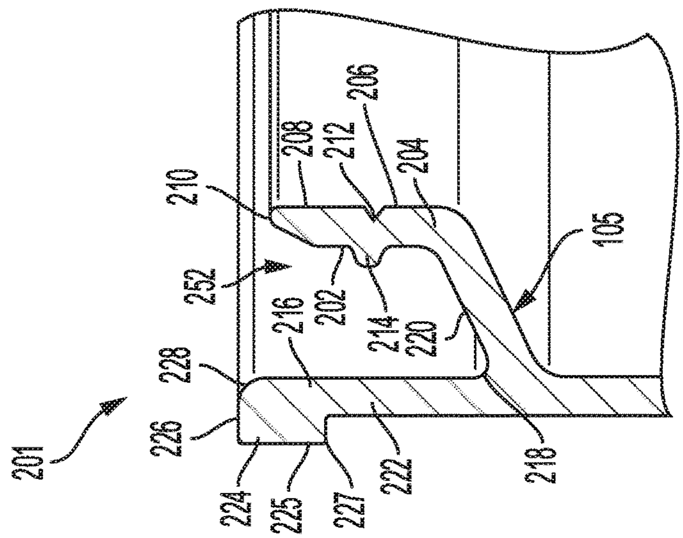

FIGS. 2A, 2B, and 2C include cross sections of different embodiments of built-in rings 201, 203, 205 as contemplated herein. As will be understood from discussions herein, this disclosure is not limited to the embodiments shown in FIGS. 2A, 2B, and 2C as other embodiments are contemplated. Although not all possible feature combinations are shown, it will be understood that features shown in FIGS. 2A, 2B, and 2C (and other figures shown herein) may be interchangeable or included in other embodiments. For example, FIG. 2C shows an inner sidewall 204 with a substantially rectangular seal surface peak 238 and a substantially smooth seal surface 236 (e.g., seal surface 236 does not include a notch 212 as shown in the embodiment in FIG. 2B). Continuing with this example, although not shown, it will be understood that this disclosure contemplates an embodiment that includes a substantially rectangular seal surface peak 238 (shown in FIG. 2C) and a notch 212 (shown in FIG. 2B), along with other combinations of features. Further, the embodiments shown in FIGS. 2A, 2B, and 2C include one or more common or similar features, which include the same call-out numbers.

At a high-level, the built-in rings 201, 203, 205 each include seal structures 105, 107, 109 that include a generally u-shaped channel 252. In the embodiments shown in FIGS. 2A, 2B, and 2C, the u-shaped channel 252 (from a cross-sectional perspective) includes two sidewalls 204, 222 connected by a floor 220 that generally slopes from an inner sidewall 204 downwardly to an outer sidewall 222, whereby the outer sidewall 222 and the floor 220 form a substantially rounded connection 218. In certain embodiments, the floor 220 may slope at an angle between forty-five and ninety degrees, preferably at an angle between forty-five and fifty degrees, relative to the outer sidewall 222. In one or more embodiments, and as shown in FIGS. 2A, 2B, and 2C, the distance between the inner sidewall 204 and the outer sidewall 222 may be any suitable distance (e.g., 0.8-1.2 cm, 4.8-5.2, cm, 9.8-10.2 cm, etc.). As will be further discussed below, the inner sidewall 204 includes seal surfaces 202, 208, 232, 236 (depending on the embodiment) and integrally formed protrusions (e.g., ring bead 214, 215, seal ring notch 212) of the seal structure 105, 107, 109.

In particular embodiments, and as shown in FIG. 2A, the seal surfaces 202, 208 of the inner sidewall 204 converge at an upper portion of the built-in ring into a substantially triangular seal surface peak 210 (which fits into a similarly shaped opening in a lid). In certain embodiments, the seal surfaces 202, 208 are substantially flat. In one embodiment, the seal surfaces 202, 208 may be composed of an elastomer. In another embodiment, the seal surfaces 202, 208 are composed of plastic.

Continuing with the embodiment shown in FIG. 2A, the inner sidewall 204 includes ring bead 214 (or other suitable protrusion) that extends into the u-shaped channel 252 of the built-in ring 201. In various embodiments, the ring bead 214 is substantially rounded or substantially trapezoidal in shape. In one or more embodiments, the ring bead 214 (e.g., protrusion) engages with a corresponding seal structure on the container lid, such that a liquid-tight seal between the container and the container lid may be formed. For example, in particular embodiments, the ring bead 214 engages with a corresponding undercut on the container lid, and, in combination with the seal surfaces 202, 208, facilitates a liquid-tight seal between the container and the lid.

In one or more embodiments, and as shown in FIG. 2A, the outer surface 206 of the inner sidewall 204 of the seal structure 105 includes a seal ring notch 212. In particular embodiments, the seal ring notch 212 is a groove (e.g., indentation) on the outer surface 206 of the inner sidewall 204 of the seal structure 105. In certain embodiments, the seal ring notch 212 may be positioned substantially opposite the ring bead 214 on the inner sidewall 204. In one or more embodiments, the seal structure 105 does not include a seal ring notch 212 (e.g., the embodiment shown in FIG. 2C).

The seal ring notch 212 may be of any suitable shape. In one embodiment, the seal ring notch 212 is substantially triangular. In at least one embodiment, the seal ring notch 212 is substantially rectangular or rounded. In various embodiments the seal ring notch 212 may be defined by the outer surface 206 of the inner sidewall 204 and generally facilitates a seal with a corresponding structure on a lid, as further discussed below.

Continuing with the embodiment shown in FIG. 2A, the built-in ring 201 includes a container bead 224 (also sometimes called a "can bead") around an external circumference of the container proximate the generally u-shaped channel 252. In at least one embodiment, the container bead 224 is integrally formed with the outer sidewall 222. In various embodiments, the container bead 224 is a protrusion that extends outwardly from the outer sidewall 222 of the container and includes a top surface 226 and bottom surface 227 that are generally parallel to a bottom surface of the container as shown in FIG. 2A. In some embodiments, the distance between the top surface 226 and the bottom surface 227 of the container bead 228 may be less than 30 mm. In one or more embodiments, the container bead includes an outer surface 225 that is substantially parallel to an inner surface outer sidewall 222 of the container. In some embodiments, the top surface 226 and the bottom surface 227 of the container bead 224 are integrally connected by the outer surface 225 of the container bead 224. As shown in FIG. 2A, the outer sidewall 222 includes an inner surface 216 that transitions to the top surface 226 of the container bead 224 via a rounded surface 228 with a particular radius.

In one or more embodiments, the top surface 226 of the container bead 224 (and thus the top surface of the outer sidewall 222 of the u-shaped channel 252) is at a higher elevation from the container bottom than a top surface of the seal structure 105 (e.g., triangular peak 210). In at least one embodiment, the top surface 226 of the container bead 224 is at a first distance from the bottom surface of the container, and the top surface of the seal structure 105 (e.g., triangular peak 210) is at a second distance from the bottom surface of the container, where the first distance is greater than the second distance. In particular embodiments, the "tiered elevation" of the top surface 226 of the container bead 224 and the top surface of the seal structure 105 (e.g., triangular peak 210) may help increase stability and load distribution when two (or more) containers are stacked together (e.g., for shipping, without lids), as portions of the container bottom may match the tiered elevation of the sidewalls of the u-shaped channel (see, e.g., FIG. 4, below).

As will be understood from discussions herein, the inner sidewall 204 is received within a generally u-shaped channel of a container lid, and the seal surfaces 202, 208 and ring bead 214 help create a seal between the inner sidewall 204 and the container lid, thereby sealing an interior/storage area of the container.

Turning now to FIG. 2B, a cross section of an alternate embodiment of a built-in ring 203 is shown, according to one aspect of the present disclosure. The embodiment shown in FIG. 2B includes similar features as described in relation to FIG. 2A, with several differences as further described herein. In the embodiment shown in FIG. 2B, the seal surfaces 202, 232 of the inner sidewall 204 converge at an upper portion of the built-in ring into a substantially rounded seal surface peak 254 (which fits into a similarly shaped opening in a lid). In certain embodiments, the top surface of the seal structure 105 shown in FIG. 2A (e.g., triangular peak 210) is at a higher elevation from the container bottom than the top surface of the seal structure 107 shown in FIG. 2B (e.g., rounded peak 254).

FIG. 2C shows a cross section of an alternate embodiment of a built-in ring 205, according to one aspect of the present disclosure. The embodiment shown in FIG. 2C includes similar features as described in relation to FIGS. 2A and 2B, with several differences as further described herein. In various embodiments, and as shown in FIG. 2C, the floor 220 connecting the inner sidewall 204 and outer sidewall 222 may slope at an angle less than forty-five degrees relative to the outer sidewall 222. In one or more embodiments, the seal surfaces 202, 236 of the inner sidewall 204 converge at an upper portion of the built-in ring into a substantially rectangular seal surface peak 238 (which fits into a similarly shaped opening in a lid).

The embodiment shown in FIG. 2C includes a container bead 248 which includes a top surface 250. In some embodiments, and as shown in FIG. 2C, the distance between the top surface 250 and the bottom surface 258 of the container bead 248 is less than the corresponding distance shown in FIGS. 2A and 2B. In various embodiments, and as shown in FIG. 2C, the width of the top surface 250 of the container bead 248 is less than the width of the top surface of container bead described in relation to FIGS. 2A and 2B.

In particular embodiments, the top surface 250 of the container bead 248 transitions (e.g., slopes downwardly) to a protrusion 256 extending from the inner surface 216 of the outer sidewall 222 via a downwardly sloped surface 246. In at least one embodiment, the protrusion 256 extending from the inner surface 216 of the outer sidewall 222 may facilitate a liquid-tight seal when engaged with a container lid. In one or more embodiments, the protrusion 256 extending from the inner surface 216 of the outer sidewall 222 is at higher elevation from the container bottom than a ring bead 215. In certain embodiments, the ring bead 215 and the protrusion 256 extending from the inner surface 216 of the outer sidewall 222 may be at substantially equal elevations.

In one or more embodiments, and as shown in FIG. 2C, the ring beads 215 may include an upper ring bead slope 219 and a lower ring bead slope 217 that converge into a ring bead peak 221. In certain embodiments, the upper ring bead slope 219 may be steeper than the lower ring bead slope 217. In at least one embodiment, the ring bead 215 may not extend as far into the u-shaped channel 502*c* as the ring bead 214 shown in FIGS. 2A and 2B.

In particular embodiments, the top surface 250 of the container bead 248 (and thus the top surface of the outer sidewall 222 of the u-shaped channel 252) is at a substantially similar elevation from the container bottom (e.g., within the same plane) as a top surface of the seal structure 109 (e.g., rectangular peak 238).

Figure 3:
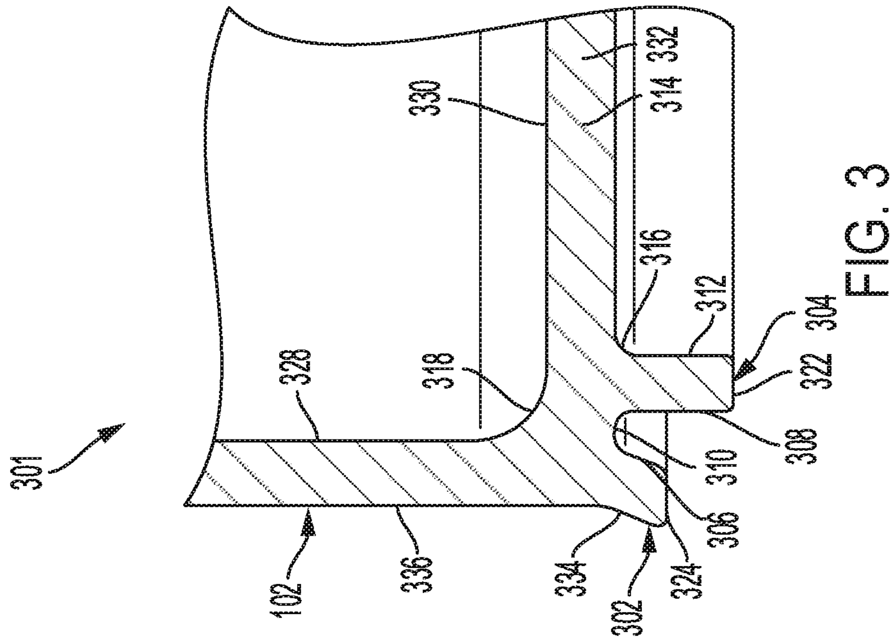
FIG. 3 is a cross-sectional view of an exemplary container, according to one embodiment of the present disclosure.

FIG. 3 shows a cross section of an exemplary container bottom 301, according to one aspect of the present disclosure. In various embodiments, and as shown in FIG. 3, the container bottom 301 includes a substantially flat bottom panel 314. In one or more embodiments, the bottom panel 314 includes an inner surface 330 and an outer surface 332. In some embodiments, an inner wall 328 of the container body 102 forms a substantially rounded connection 318 with the inner surface 330 of the bottom panel 314 to facilitate load distribution and mitigate stress at the point of connection 318.

In one or more embodiments, the container bottom 301 includes legs 302, 304 to provide stability for the container. In various embodiments, the upper leg 302 includes a base 324, an outer portion 334, and an inner portion 306. In at least one embodiment, the outer portion 334 of the upper leg 302 is connected to an outer wall 336 of the container body 102. In some embodiments, the outer portion 334 of the upper leg 302 connects to the outer wall 336 of the container body 102 at an obtuse angle.

In particular embodiments, the lower leg 304 includes a base 322, an outer portion 312, and an inner portion 308. In one or more embodiments, the inner portion 306 of the upper leg 302 is connected to the inner portion 308 of the lower leg 304 at a connection point 310. In one embodiment, the connection point 310 where the inner portion 308 of the lower leg 304 connects to the inner portion of the upper leg 302 is substantially rounded. In some embodiments, the inner portion 308 of the lower leg 304 and the inner portion of the upper leg 302 may be substantially perpendicular such that the connection point 310 substantially forms a right angle.

In some embodiments, the base 322 of the lower leg 304 provides stability and support when the container is rested on a surface. In one embodiment, an outer portion 312 of the lower leg 304 may connect to the outer layer 332 of the bottom panel 314 via a substantially rounded connection point 316. In further embodiments, the connection point 316 between the outer portion 312 of the lower leg 304 and the outer surface 332 of the bottom panel 314 may be substantially perpendicular. In certain embodiments, the connection point 316 between the outer portion 312 of the lower leg 304 and the outer surface 332 of the bottom panel 314 may be substantially perpendicular with a rounded edge.

Figures 4A, 4B, 4C:
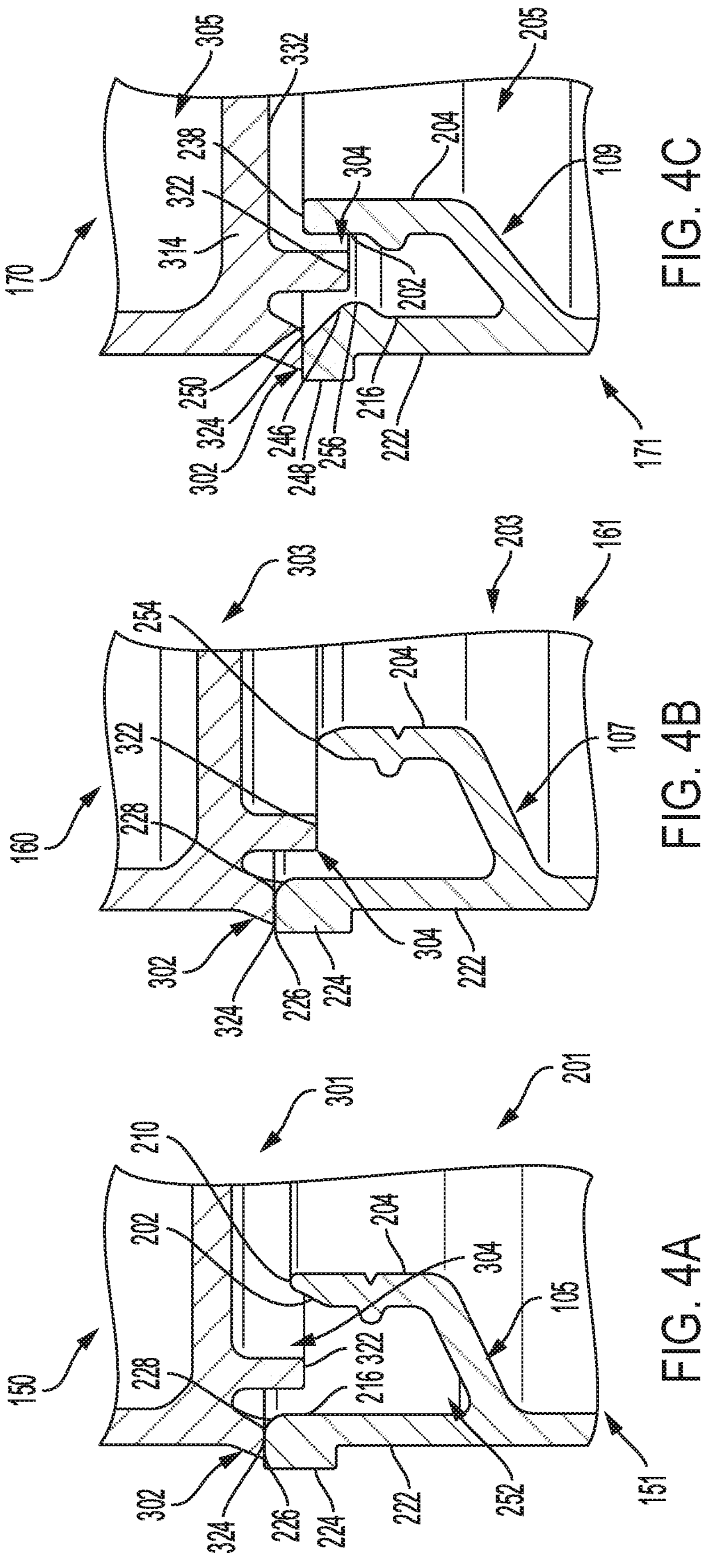
FIGS. 4A, 4B, and 4C are cross sectional views of exemplary containers in a stacked configuration, according to embodiments of the present disclosure.

Now referring to FIGS. 4A, 4B, and 4C, cross sectional views of exemplary containers in a stacked configuration are shown, according to embodiments of the present disclosure. In various embodiments, the container beads 224, 248 facilitate stacking (i.e., nesting) of multiple containers with built-in rings 201, 203, 205 on top of one another by providing a stable surface area for the bottom of a container 301, 303, 305 to rest upon. In these embodiments (and others), the weight of the stacked container (e.g., the container on the top of the stack) is distributed throughout the supporting container (e.g., the container on the bottom of the stack).

In certain embodiments, the legs 302, 304 of the container bottom 301, 303, 305 of the top container 150, 160, 170 are situated to rest on top of the container bead 224, 248 of the bottom container 151, 161, 171. In particular embodiments, the base 324 of the upper leg 302 is substantially parallel to the top surface 226, 250 of the container bead 224, 248, such that the top surface 226, 250 of the container bead 224, 248 provides evenly distributed support for the upper leg 302 of the container bottom 301, 303, 305. In one or more embodiments, and as shown in FIGS. 4A and 4B, the lower leg 304 is substantially between the sidewalls 204, 222 of the u-shaped channel 252 of the built-in ring 201 (e.g., seal structure 105, 107), whereby the lower leg 304 and the upper leg 302 straddle the rounded surface 228 where the container bead 224 connects to the inner surface 216 of the outer sidewall 222.

In one embodiment, and as shown in FIG. 4A, the base 324 of the upper leg 302 is positioned to rest on the top surface 226 of the container bead 224, and the base 322 of the lower leg 304 is adjacent to the inner seal surface 202. In particular embodiments, the inner seal surface 202 is sloped. In at least one embodiment, the inner seal surface 202 is substantially vertical. In some embodiments, the base 322 of the lower leg 304 is substantially parallel to the top surface (e.g., triangular peak 210) of the seal structure 105.

In some embodiments, and as shown in FIG. 4B, the base 322 of the lower leg 304 is positioned to rest on the rounded peak 254 of the seal structure 107, such that the rounded peak 254 of the built-in ring 203 provides stability and support for the container bottom 303.

In further embodiments, and as shown in FIG. 4C, the base 322 of the lower leg 304 is positioned to rest between the protrusion 256 extending from the inner surface 216 of the outer sidewall 222 and the inner seal surface 202 of the inner sidewall 204. In these embodiments (and others), the upper leg 302 and the lower leg 304 straddle the sloped surface 246 that connects the top surface 250 of the container bead 248 to the protrusion 256 extending from the inner surface 216 of the outer sidewall 222. In particular embodiments, and as shown in FIG. 4C, the rectangular peak 238 of the seal structure 109 is substantially parallel to the outer surface 332 of the bottom panel 314 of the container bottom 305. In one or more embodiments, the rectangular peak 238 of the seal structure 109 makes contact with the outer surface 332 of the bottom panel 314, such that the rectangular peak 238 provides additional support for the container bottom 305.

Exemplary Container Lid

Figure 5:
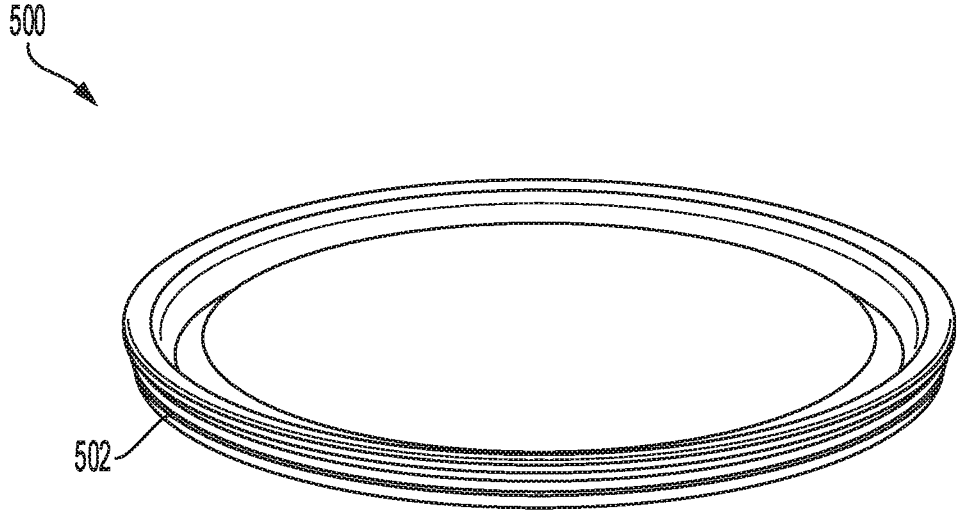
FIG. 5 is a perspective view of an exemplary container lid, according to one embodiment of the present disclosure.

FIG. 5 shows a perspective view of an exemplary container lid 500, according to one embodiment of the present disclosure. In at least one embodiment, the container lid 500 is substantially circular in shape. In various embodiments, the container lid 500 may be rectangular, square, or any other suitable shape. In particular embodiments, the container lid 500 includes an interior u-shaped channel 502 for providing a sealing mechanism when combined with the u-shaped channel of the container, as discussed above and as will be further discussed herein.

Figure 6C:
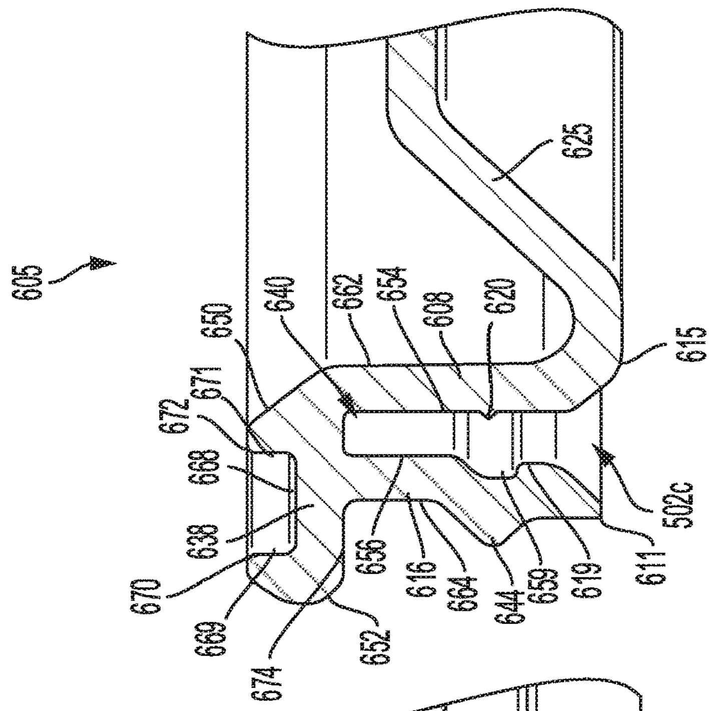
FIGS. 6A, 6B, and 6C are cross-sectional views of an exemplary container lid, according to embodiments of the present disclosure.
Figure 6B:
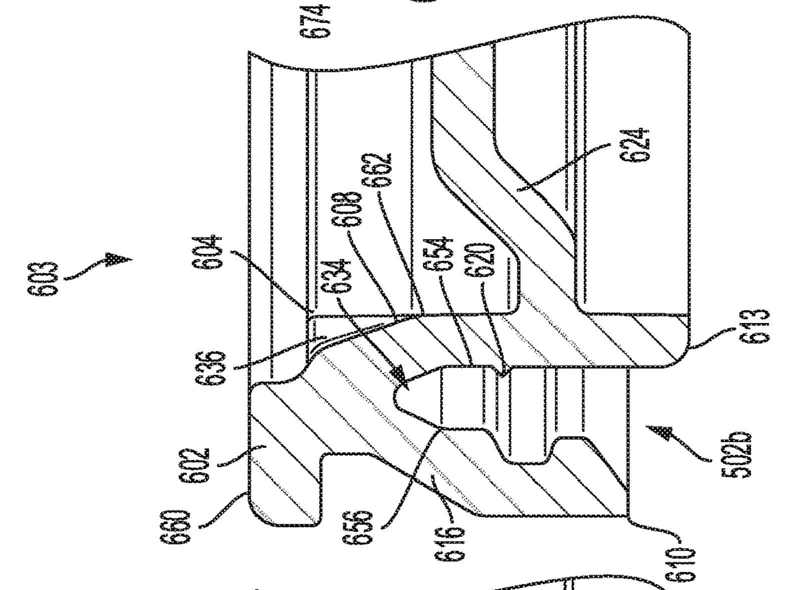
Figure 6A:
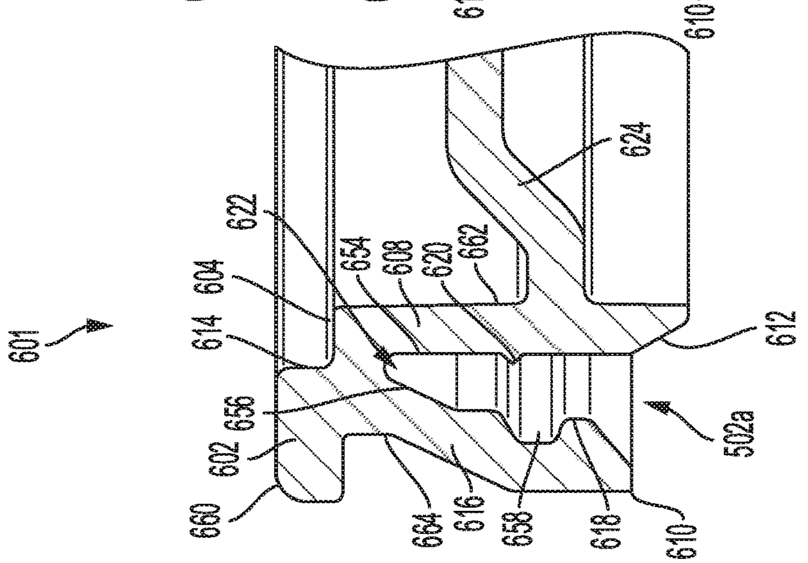

As discussed above in regards to FIG. 5, container lids discussed herein may include an interior u-shaped channel (e.g., interior u-shaped channel 502) for engaging with a corresponding structure on a container. FIGS. 6A, 6B, and 6C, and 15 include different embodiments of container lids 601, 603, 605 as contemplated herein. As will be understood from discussions herein, this disclosure is not limited to embodiments shown in FIGS. 6A, 6B, and 6C as other embodiments are contemplated. As discussed above, in reference to FIGS. 2A, 2B, and 2C, although not all feature combinations are shown in FIGS. 6A, 6B, and 6C, it will be understood that features shown in these figures (and others) may be interchangeable or included in other embodiments. Further, the embodiments shown in FIGS. 6A, 6B, and 6C include one or more common or similar features, which include the same call-out numbers.

At a high-level, the containers 601, 603, 605 each include an interior u-shaped channel 502*a*, 502*b*, 502*c* with contoured lead-in features 610, 611, 612, 613, 615 wherein the interior u-shaped channel 502*a*, 502*b*, 502*c* facilitates a liquid-tight seal in combination with the u-shaped channel of the container. In various embodiments, the containers 601, 603, 605 include an interior lid sidewall 608 and an exterior lid sidewall 616, each with a lead-in feature 610, 611, 612, 613, 615 (e.g., sloped or curved surfaces that makes it easier for a user to affix the lid 601, 603, 605 to corresponding structures of a container).

Additionally, the embodiments shown in FIGS. 6A, 6B, and 6C include a seal ring 620 on the inner most seal surface 654 of the interior lid sidewall 608. In various embodiments, the seal ring 620 may engage with a corresponding notch defined by an outer sidewall of the u-shaped channel of the container, which further facilitates sealing when the container lid is engaged with the inner wall (e.g., built-in ring) of the container, as shown in FIGS. 8 and 9 below. In some embodiments, the inner most seal surface 654 of a container lid 601, 603, 605 may not include a seal ring 620.

In particular embodiments, and as shown in FIG. 6A, the interior lid sidewall 608 includes a lead-in feature 612 that extends further downward than a lead-in feature 610 of the exterior lid sidewall 616. In one embodiment, and as shown in FIG. 6A, the lead-in feature 612 on the interior lid sidewall 608 is positioned at a substantially acute angle relative to the bottom of the container lid 601.

According to various aspects, the interior u-shaped channel 502*a* includes a channel between the interior lid sidewall 608 and the exterior lid sidewall 616 for receiving an inner sidewall of a container (as discussed above). The u-shaped channel 502*a*, in the embodiment shown in FIG. 6A, includes seal surfaces 654, 656 on opposite sides that converge into a substantially triangular cavity 622, such that when engaged with the inner sidewall of the container, the seal surfaces 654, 656 provide a full-contact (or nearly full-contact) area whereby a liquid-tight seal may be established.

Continuing with the embodiment shown in FIG. 6A, the inner most seal surface 654 is substantially flat. In at least one embodiment, the outer most seal surface 656 includes an indentation 658 that forms an undercut 618. In certain embodiments, the undercut 618 allows the container lid to engage with a ring bead of a container to help secure the seal surfaces 654, 656 of the container and lid 601.

In certain embodiments, and as shown in FIG. 6A, the exemplary container lid 601 may include a tapered wall 624. In some embodiments, the tapered wall 624 extends in a single step-like manner from an exterior wall 662 of the inner lid sidewall 608 and forms the top surface 604 of the lid (e.g., that covers majority of the opening of the container in at least one embodiment). In some embodiments, the tapered wall 624 allows the container lid 601 to have greater flexibility and better impact performance.

In various embodiments, and as shown in FIG. 6A, the exemplary container lid 601 may include a ledge 602 to facilitate removal of a container lid 601 from a container. In one or more embodiments, the ledge 602 may be flexible, rigid, or of any suitable structure to obtain the functionality described herein. In certain embodiments, the ledge 602 extends outwardly from an exterior surface 664 of the exterior lid sidewall 616 and is substantially parallel to the bottom surface of a container (when the lid is attached to the container). In one or more embodiments, the top surface 660 of the ledge 602 is at a higher elevation from the bottom of the container than the top surface 604 of the interior lid sidewall 608. In particular embodiments, the top surface 660 of the ledge 602 transitions to the top surface 604 of the interior lid sidewall 608 via a vertical wall 614. In these embodiments (and others), the vertical wall 614 forms substantially rounded right angles with the top surface 660 of the ledge 602 and the top surface 604 of the interior lid sidewall 608.

Now referring to FIG. 6B, a cross section of an alternate embodiment of a container lid 603 is shown, according to one aspect of the present disclosure. The embodiment shown in FIG. 6B includes similar features as described in relation to FIG. 6A, with several differences as further described herein.

In the embodiment shown in FIG. 6B, the u-shaped channel **502*b* includes seal surfaces 654, 656 on opposite sides that converge into a substantially rounded cavity 634, such that when engaged with the inner sidewall of a corresponding container, the seal surfaces 654, 656** provide a full-contact (or nearly full-contact) area whereby a liquid-tight seal may be established.

In particular embodiments, and as shown in FIG. 6B, the exemplary container lid 603 may include a nest feature 636 to facilitate stacking (e.g., nesting) of multiple container lids on top of one another. In particular embodiments, the nest feature 636 may be curved such that it may accept the contoured shape of the inner container lid lead-in feature 613 when stacked with another container lid.

Continuing with the embodiment shown in FIG. 6B, the top surface 604 of the lid 603 includes the top surface 660 of the ledge 602, which transitions downward to the surface of the nest feature 636 and downward to the exterior wall 662 of the inner lid sidewall 608. In various embodiments, the top surface 604 of the lid 603 extends toward a center of the lid 603 substantially perpendicular to the exterior wall 662 of the inner lid sidewall 608, and substantially parallel to the top surface 660 of the ledge 602, and then transitions upward to form the tapered wall 624.

FIG. 6C shows a cross section of an alternate embodiment of a built-in ring 605, according to one aspect of the present disclosure. The embodiment shown in FIG. 6C includes similar features as described in relation to FIGS. 6A and 6B, with several differences as further described herein.

In the embodiment shown in FIG. 6C, the u-shaped channel **502*c* includes seal surfaces 654, 656 on opposite sides that converge into a substantially rectangular cavity 640, such that when engaged with the inner sidewall of a corresponding container, the seal surfaces 654, 656** provide a full-contact (or nearly full-contact) area whereby a liquid-tight seal may be established.

In various embodiments, and as shown in FIG. 6C, the exemplary container lid 605 includes a nesting ledge 638 to facilitate removal of a container lid 605 from a container, and to facilitate stacking of one or more container lids or containers on top of the container lid 605. In particular embodiments, the nesting ledge 638 includes a substantially flat basin area 668 defined by an inner surface 669 of a left wall 670 and an inner surface 671 of a right wall 672. In at least one embodiment, the substantially flat basin area 668 provides stability and support for a container or container lid 605 in a stacking configuration. In certain embodiments, the outer surface 650 of the right wall 672 may be connected to the exterior wall 662 of the inner lid sidewall 608. In one or more embodiments the outer surface 650 of the right wall 672 may be a sloped surface. In particular embodiments, the outer surface 652 of the left wall 670 may be substantially curved. In some embodiments, the outer surface 652 of the left wall 670 may be connected to the exterior surface 664 of the exterior lid sidewall 616 via a substantially flat surface 674 that is substantially parallel to the bottom surface of a container (when the lid is attached to the container).

Continuing with the embodiment shown in FIG. 6C, the lead-in feature 615 on the interior lid sidewall 608 is substantially rounded at the bottom. In particular embodiments, the bottom of the lead-in feature 615 on the interior lid sidewall 608 of the container lid 605 may be substantially integrated into the tapered wall 625 of the container lid 605. In at least one embodiment, and as shown in FIG. 6C, the tapered wall 625 may extend from the bottom of the exterior wall 662 of the inner lid sidewall 608.

In various embodiments, and as shown in FIG. 6C, an exterior wall 664 of the exterior lid sidewall 616 includes a protrusion 644 extending outwardly from the exterior wall 664 of the exterior lid sidewall 616. In these embodiments (and others), the protrusion 644 extending outwardly from the exterior wall 664 of the exterior lid sidewall 616 facilitates increased sealing properties when a container is sealed by a container lid 605.

In at least one embodiment, the outer most seal surface 656 includes an indentation 659 that forms an undercut 619. In certain embodiments, the undercut 619 allows the container lid to engage with a ring bead of a container to help secure the seal surfaces 654, 656 of the container and lid 605. In at least one embodiment, and as shown in FIG. 6C, the undercut 619 may be substantially hook shaped to facilitate a secure attachment to the ring bead of a container.

Figure 7C:
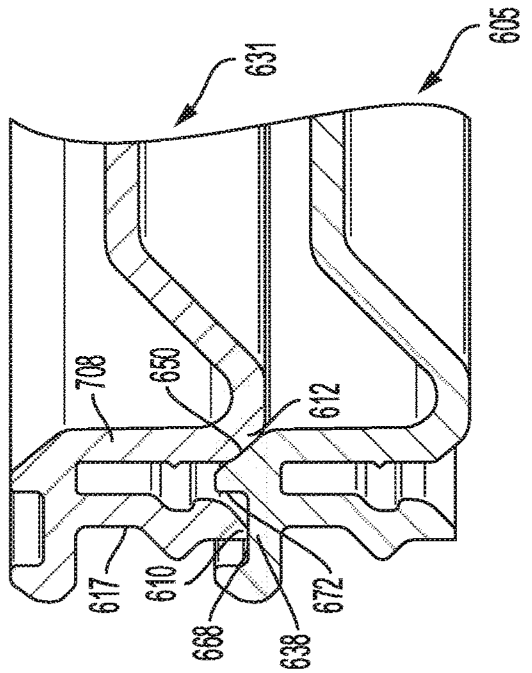
FIGS. 7A, 7B, and 7C are cross sectional views of exemplary container lids in a stacked configuration, according to embodiments of the present disclosure.
Figure 7B:
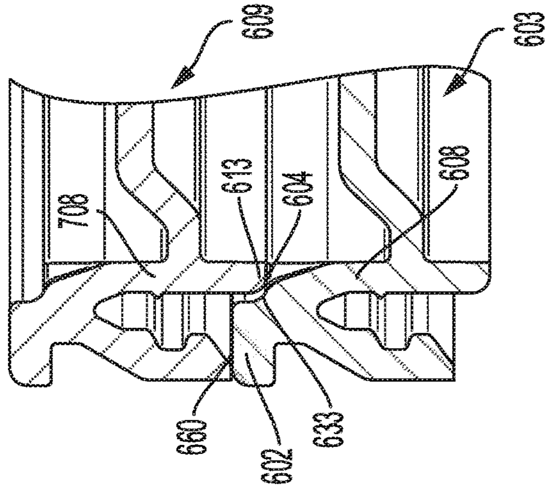
Figure 7A:
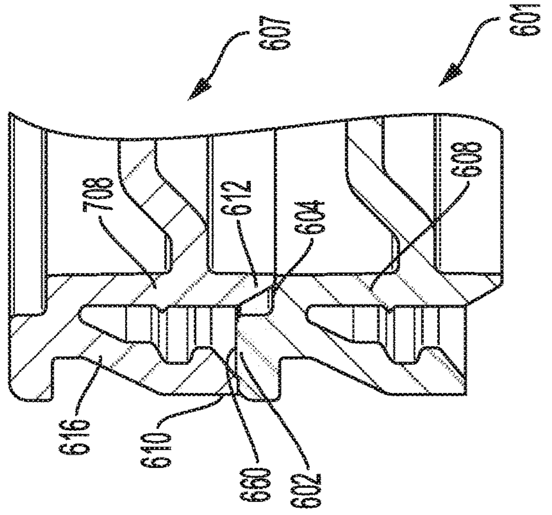

FIGS. 7A, 7B, and 7C show cross sectional views of exemplary container lids 601, 607, 603, 609, 605, 631 in a stacked configuration, according to embodiments of the present disclosure. In various embodiments, and as shown in FIG. 7A, the top surface 660 of the ledge 602 of the container lid 601 facilitates stacking (i.e., nesting) of multiple container lids 601, 607 on top of one another by providing a stable surface area for the lead-in feature 610 of the exterior lid sidewall 616 to rest upon. Continuing with FIG. 7A, in various embodiments, the lead-in feature 612 on the interior lid sidewall 708 of the top container lid 607 is positioned to distribute its weight substantially evenly between the top surface 660 of the ledge 602 and the top surface 604 of the interior lid sidewall 608 of the bottom container lid 601.

In particular embodiments, and as shown in FIG. 7B, the lead-in feature 613 on the interior lid sidewall 708 of the top container lid 609 may be substantially rounded, such that the lead-in feature 613 may be positioned to fit snugly at the substantially rounded intersection 633 where the top surface 660 of the ledge 602 is connected to the top surface 604 of the interior lid sidewall 608.

In various embodiments, and as shown in FIG. 7C, the substantially flat basin area 668 of the nesting ledge 638 facilitates stacking (i.e., nesting) of multiple container lids 605, 631 on top of one another by providing a stable surface area for the lead-in feature 610 of the exterior lid sidewall 616 to rest upon. Continuing with FIG. 7C, in certain embodiments, the sloped outer surface 650 of the right wall 672 of the nesting ledge 638 provides a stable base for the bottom of the lead-in feature 612 of the interior lid sidewall 608 of the container lid 605 to rest upon.

Exemplary Container with Built-In Ring and Container Lid

Figure 8C:
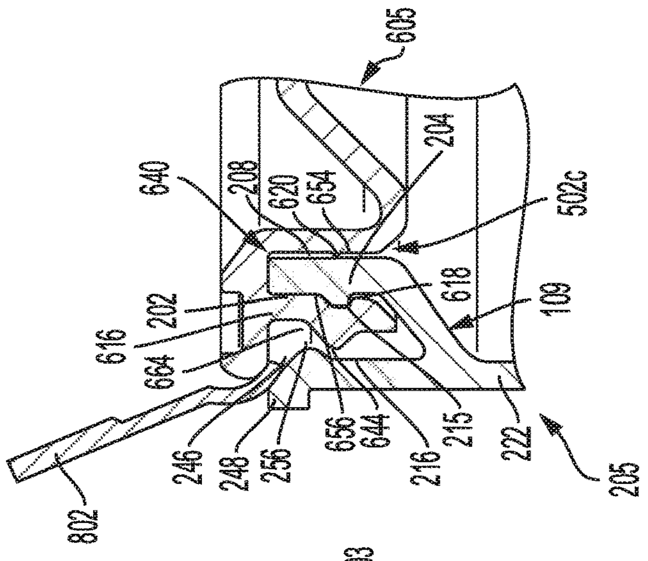
FIGS. 8A, 8B, and 8C are cross-sectional views of exemplary containers sealed with exemplary container lids, according to embodiments of the present disclosure.
Figure 8B:
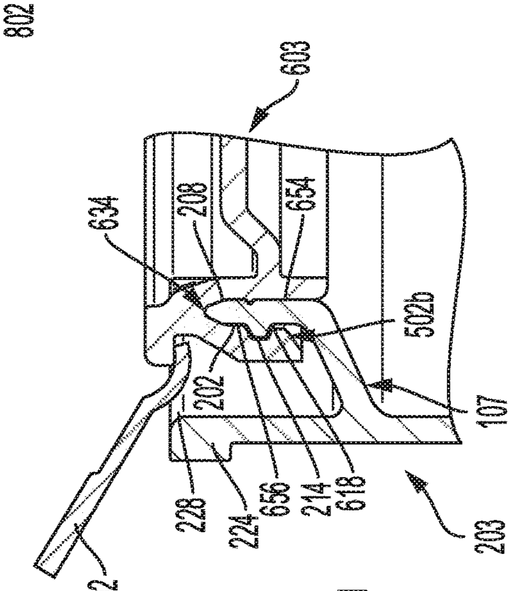
Figure 8A:
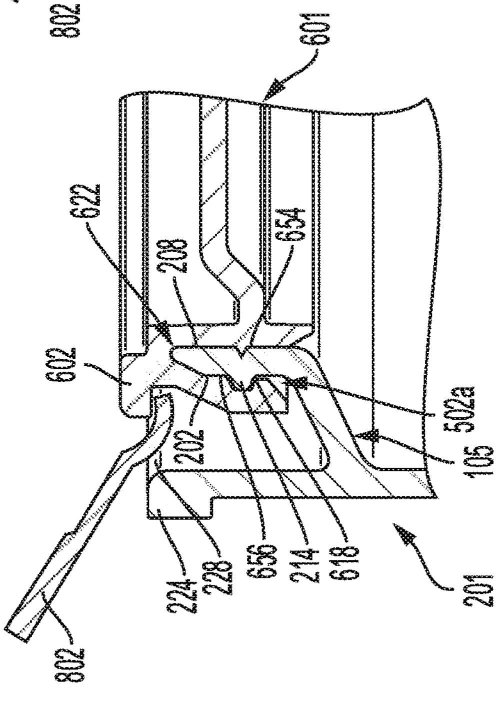

Turning now to FIGS. 8A, 8B, and 8C, cross-sectional views of exemplary containers 201, 203, 205 sealed with exemplary container lids 601, 603, 605 are shown, according to embodiments of the present disclosure. More specifically, FIGS. 8A, 8B, and 8C show the various components discussed herein as they interact together to form a liquid-tight seal in a built-in ring configuration. For example, FIGS. 8A, 8B, and 8C show the inner sidewall 204 of the seal structure 105, 107, 109 of the container 201, 203, 205 enveloped by the u-shaped channel 502*a*, 502*b*, 502*c* of the container lid 601, 603, 605, such that the seal surfaces 202, 208 of the container 201, 203, 205 are flush with the seal surfaces 654, 656 of the container lid 601, 603, 605 (including the triangular cavity 622 shown in FIG. 8A, the rounded cavity 634 shown in FIG. 8B, and the rectangular cavity 640 shown in FIG. 8C). Continuing with this example, FIGS. 8A, 8B, and 8C also show the container ring bead 214, 215 engaged with the container lid undercut 618, 619, such that a liquid-tight seal is facilitated.

In particular embodiments, and as shown in FIGS. 8A, 8B, and 8C, a removal tool 802 may be used to separate a container lid 601, 603, 605 from the built-in ring 201, 203, 205 of a container by using the rounded edge 228 of the container bead 224 (or the sloped edge 246 of the container bead 248 as shown in FIG. 8C) as a fulcrum, and the ledge 602 (or nesting ledge 638 as shown in FIG. 8C) of the built-in ring 201, 203, 205 of the container to pry the container lid 601, 603, 605 away from the container 201, 203, 205. In various embodiments, damage to the container bead 224, 248 does not hinder the sealing functionality of the built-in ring 201, 203, 205 of the container and lid 601, 603, 605.

In the embodiment shown in FIG. 8C, a protrusion 256 extending from the inner surface 216 of the outer sidewall 222 of the built-in ring 205 of the container is shown engaged with the protrusion 644 extending outward from the exterior wall 664 of the exterior sidewall 616 of the container lid 605. In these embodiments, the engagement of the respective protrusions 256, 644 provides additional protection against liquid becoming trapped in the crevices of the container.

In various embodiments, and as shown in FIG. 8C, the inner sidewall 204 of the seal structure 109 of the container 205 may not include a seal ring notch. In these embodiments (and others), the substantially flat inner sidewall 204 of the seal structure 109 of the container 205 may be enveloped by the u-shaped channel 502*c* of a container lid 605 that includes a seal ring 620, such that one or more portions of the container lid 605 and/or inner sidewall 204 deform, which further improves the sealing functionality of the disclosed seal structure. As will be understood from discussions herein, in various embodiments, the lid 605 may attach to and seal the container 205 via a friction fit.

Figure 9C:
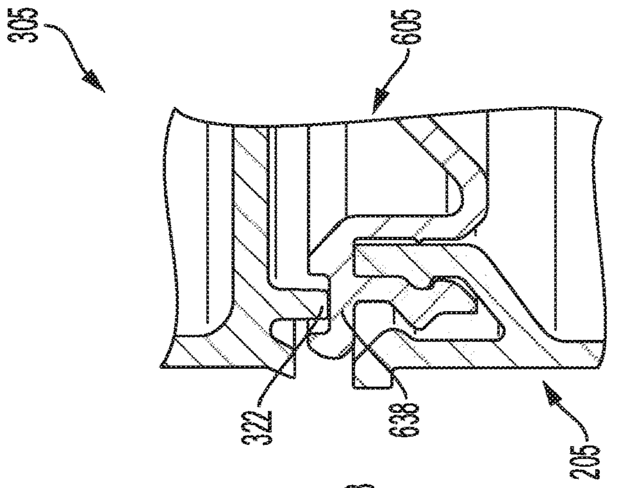
FIGS. 9A, 9B, and 9C are cross-sectional views of exemplary containers and lids in a stacked orientation, according to embodiments of the present disclosure.
Figure 9B:
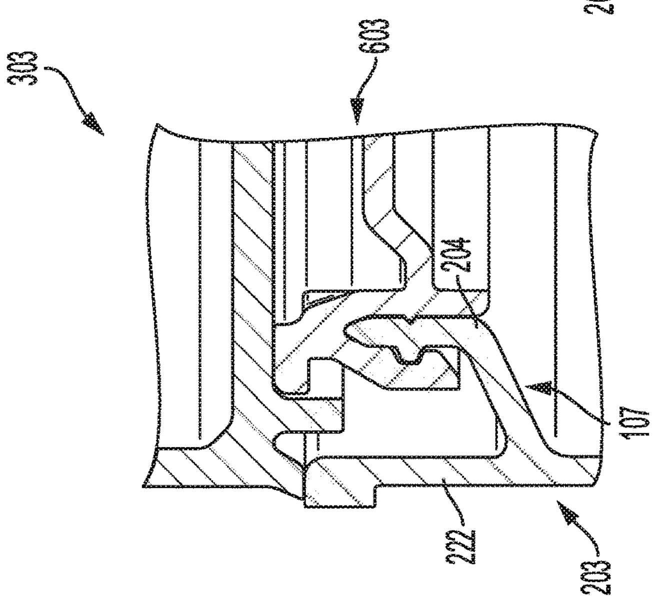
Figure 9A:
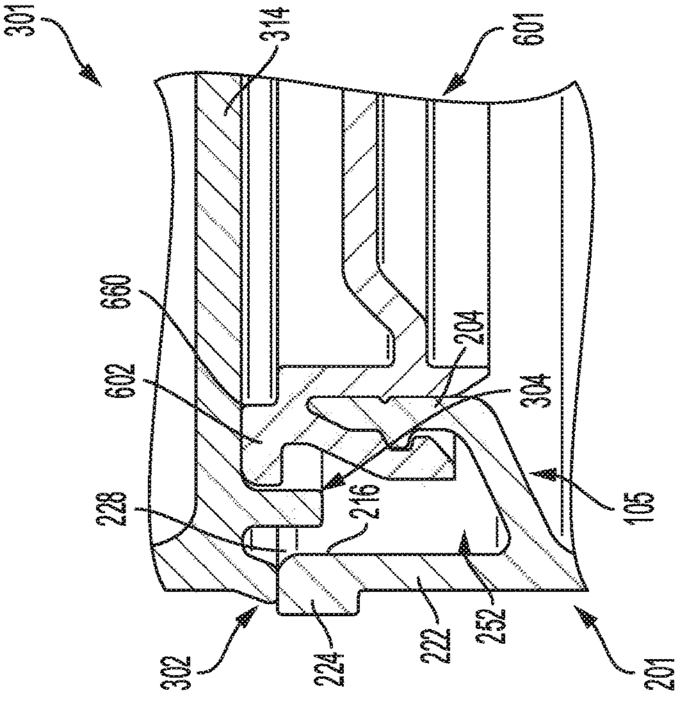

FIGS. 9A, 9B, and 9C show cross-sectional views of exemplary containers and lids in a stacked orientation, according to embodiments of the present disclosure. As shown in the present embodiments, a container bottom 301, 303, 305 sits on top of a container lid 601, 603, 605 engaged in a seal with the built-in ring 201, 203, 205 of a container.

In various embodiments, and as shown in FIG. 9A, the substantially flat shape of the top surface 660 of the ledge 602 provides a level surface for the bottom panel 314 of the container bottom 301, 303 to rest upon. In these embodiments (and others), the lower leg 304 of the container bottom 301, 303 is substantially between the sidewalls 204, 222 of the u-shaped channel 252 of the built-in ring 201—whereby the lower leg 304 and the upper leg 302 straddle the rounded surface 228 where the container bead 224 connects to the inner surface 216 of the outer sidewall 222.

As discussed above, and shown in FIG. 9B, the tiered elevation of the sidewalls 204, 222 of the seal structure 107 of the container in combination with the vertical height of the lid 603, provides stability and load distribution when two (or more) containers are sealed with lids and stacked together.

In the embodiment shown in FIG. 9C, the substantially flat basin area 668 of the nesting ledge 638 provides a level surface for the base 322 of the lower leg 304 of the container bottom 305 to rest upon.

Exemplary Container and Container Ring

Figure 10:
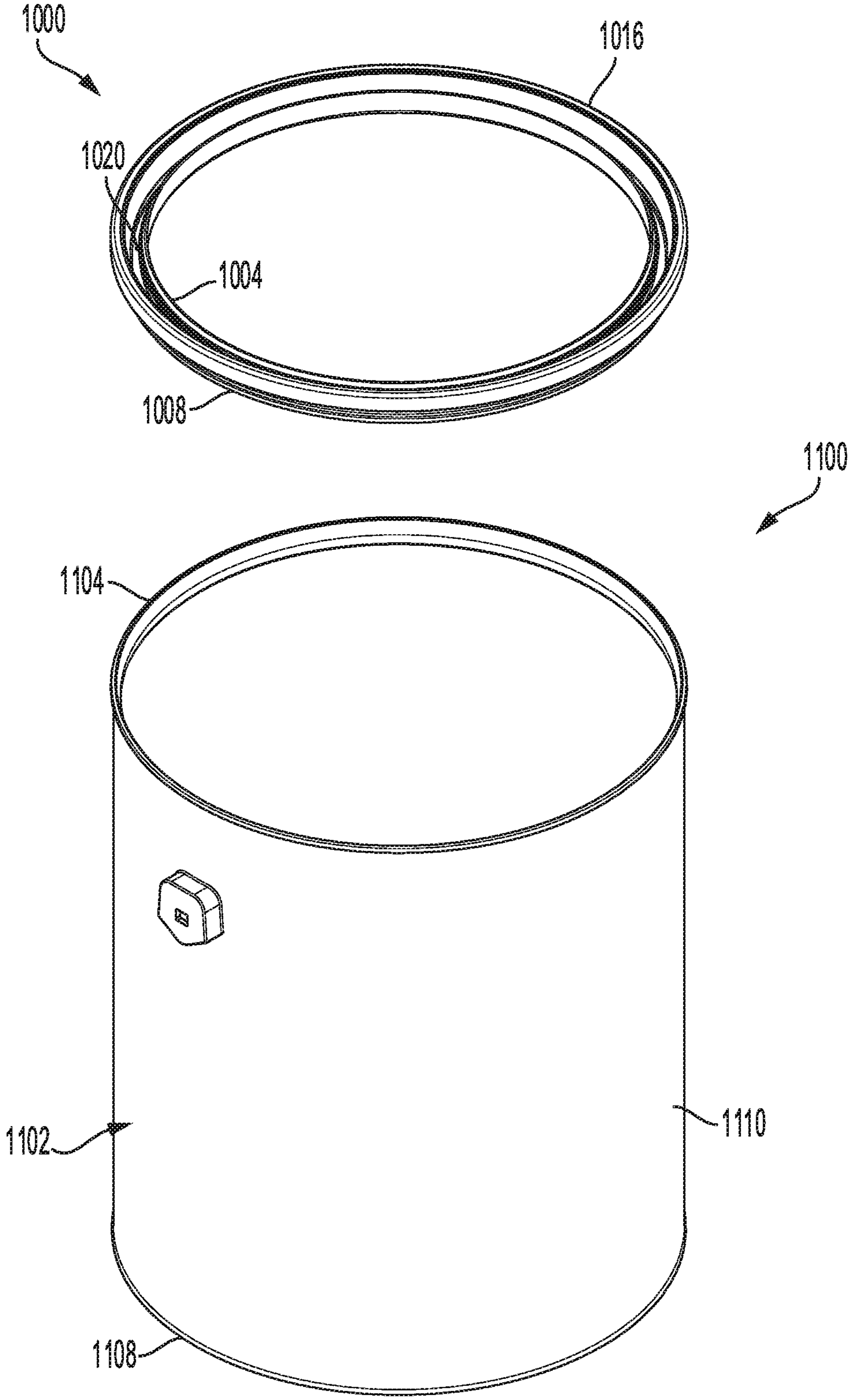
FIG. 10 is an exploded view of an exemplary container and container ring, according to one embodiment of the present disclosure.

Turning now to FIG. 10, an exploded view of an exemplary container 1100 and container ring 1000 are shown, according to one embodiment of the present disclosure. In some embodiments, the container ring 1000 and the container 1100 are circular in shape and have a substantially similar radius. In various embodiments, the container ring 1000 and container 1100 may be rectangular or square in shape. In various embodiments, the container ring 1000 attaches to the container 1100 to facilitate a liquid-tight seal. In one or more embodiments, the container ring 1000 attaches to the container 1100 by placing the bottom 1008 of the container ring 1000 snugly around the rim 1104 of the container 1100. In certain embodiments, the container ring 1000 and the container are manufactured out of plastic (e.g., Polyethylene, Polyethylene Terephthalate (PET), High-Density Polyethylene (HDPE), Polyvinyl Chloride (PVC), Low-Density Polyethylene (LDPE), Polypropylene (PP), Polystyrene (PP), etc.).

In particular embodiments, the container ring 1000 may include various components to facilitate the seal. In at least one embodiment, and as will be further discussed herein, the container ring includes an inner sidewall 1004 and an outer sidewall 1016 connected by a floor 1020. In one or more embodiments, and as shown in FIG. 10, the distance between the inner sidewall 1004 and the outer sidewall 1016 may be any suitable distance (e.g., 0.8-1.2 cm, 4.8-5.2, cm, 9.8-10.2 cm, etc.). In some embodiments, and as will be further described herein, a container lid (e.g., a plug) includes corresponding sealing components, that may align and engage with the inner sidewall 1004 of the container ring 1000 to provide a liquid-tight seal when pressed together.

In one embodiment, and as shown in FIG. 10, the container 1100 includes a container body 1102. In particular embodiments, the container body 1102 includes an external wall 1110 to enclose the container 1100 and provide a solid base for stability. In some embodiments, the external wall 1110 may include graphical information (e.g., signage). In various embodiments, the container body 1102 terminates at an open end, whereby the open end includes a rim 1104 around its circumference. In certain embodiments, and as will be further discussed herein, the container rim 1104 includes design features to facilitate a liquid-tight seal when engaged with a container ring 1000. Further, in various embodiments, the container 1100 includes a container bottom 1108 to provide stability and support for the container 1000 when resting on a surface.

Figure 11:
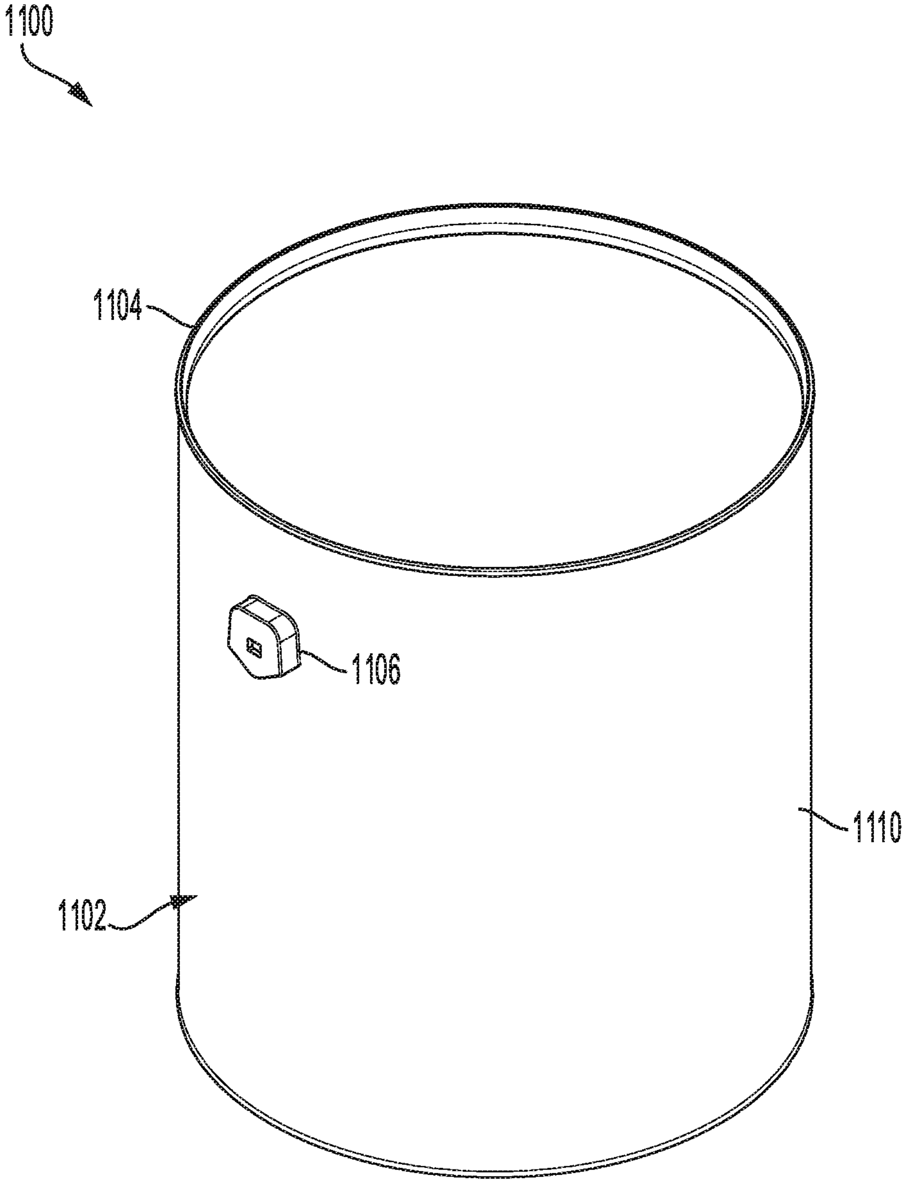
FIG. 11 is a perspective view of an exemplary container, according to one embodiment of the present disclosure.

FIG. 11 shows an exemplary container 1100, according to one embodiment of the present disclosure. In the embodiment shown in FIG. 11, plastic bail ears 1106 are included on the external wall 1110 of the container body 1102, such that a handle may be attached to the container 1100 to facilitate carrying or lifting of the container. In various embodiments, the bail ears 1106 may be circular, pentagonal, rectangular, or any suitable shape. In particular embodiments, the bail ears 1106 may be affixed to the external wall 1110 of the container body 1102, or, in one or more embodiments, the bail ears 1106 may be an integral component of external wall 1110 of the container body 1102.

Figure 12:
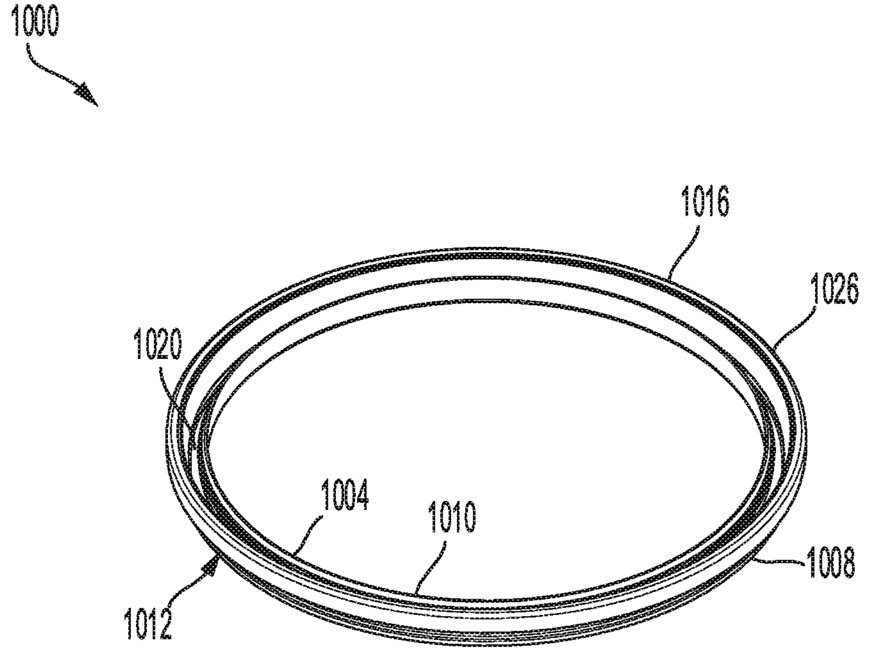
FIG. 12 is a perspective view of an exemplary container ring, according to one embodiment of the present disclosure.

FIG. 12 shows an exemplary container ring 1000, according to one embodiment of the present disclosure. In particular embodiments, and as shown in FIG. 12, a top surface 1026 of the outer sidewall 1016 is at a higher elevation than a top surface 1010 of the inner sidewall 1004 relative to the container ring floor 1020. In certain embodiments, the thickness of the inner sidewall 1004 is less than the thickness of the outer sidewall 1016. As will be further discussed herein, in some embodiments, the outer sidewall 1016 includes an aperture 1012 underneath the top surface 1026 to facilitate attachment of the container ring 1000 to the rim of a container. In at least one embodiment, the outer sidewall 1016 extends upward at an angle greater than ninety degrees from the container ring floor 1020. In one or more embodiments, the inner sidewall 1004 has a smaller radius than the outer sidewall 1016, whereby the difference in radii is substantially equivalent to the width of the container ring floor 1020. In some embodiments, the width of container floor 1020 and the angle of the outer sidewall 1026 generally prevent liquid from getting trapped in the container ring 1000. In at least one embodiment, the floor 1020 of the container ring 1000 includes a generally smooth surface.

Figure 13:
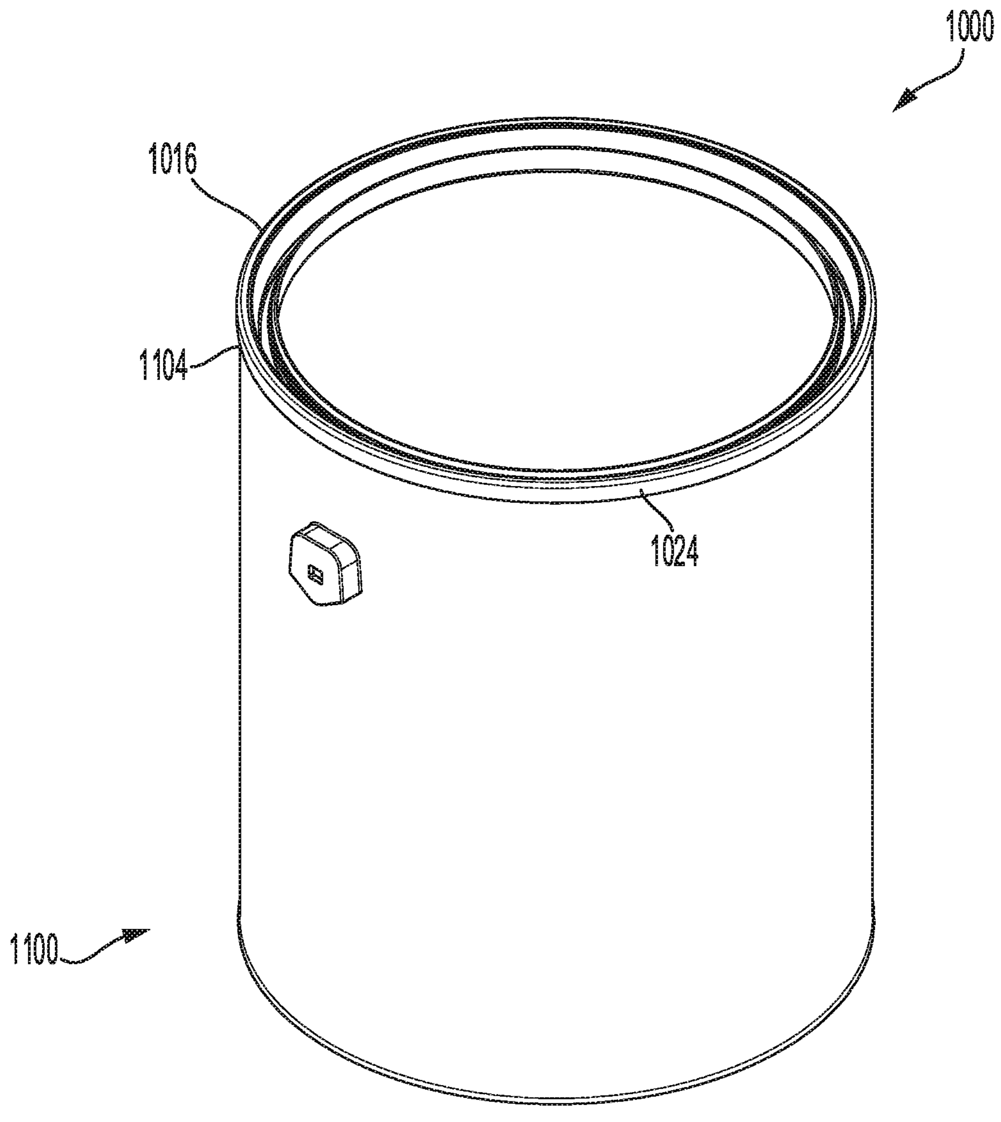
FIG. 13 is a perspective view of an exemplary container ring and container in an attached configuration, according to one embodiment of the present disclosure.

Turning now to FIG. 13, a perspective view of an exemplary container ring 1000 attached to an exemplary container 1100 is shown, according to one embodiment of the present disclosure. In various embodiments, and as shown in FIG. 13, when the container ring 1000 is attached to the container 1100, the container rim 1104 of the container 1100 is substantially enveloped by the container ring 1000, such that an outer surface 1024 of the outer sidewall 1016 hangs over the edge of the container rim 1104.

Figure 14:
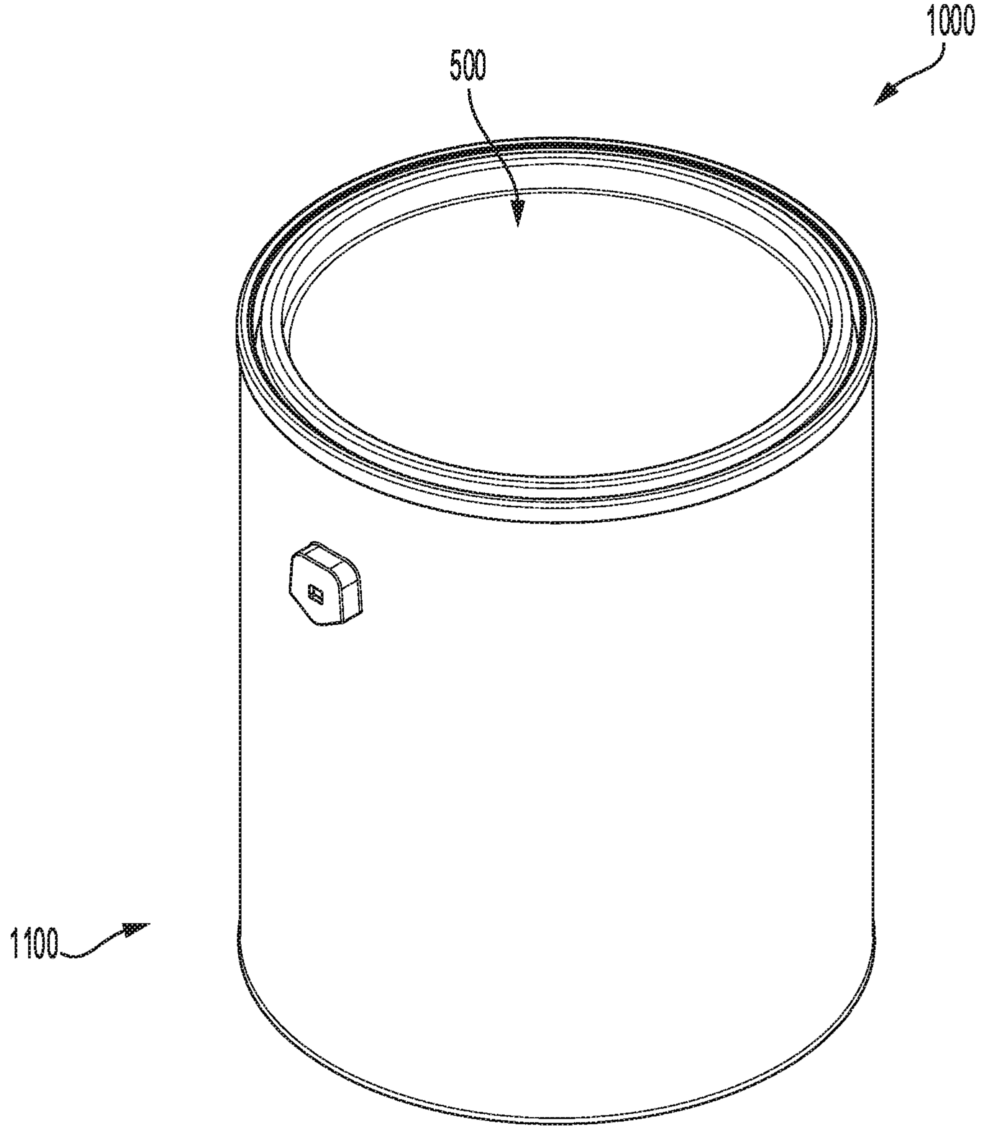
FIG. 14 is a perspective view of an exemplary container ring, container, and container lid in an attached configuration, according to one embodiment of the present disclosure.

FIG. 14 shows an exemplary container ring 1000, container 1100, and container lid 500 in an attached configuration, according to one embodiment of the present disclosure. In particular embodiments, and as will be discussed herein, various sealing components of the container lid 500 engage with the inner sidewall (not shown) of the container ring 1000 to facilitate a liquid-tight seal of the container 1100.

Figure 15:
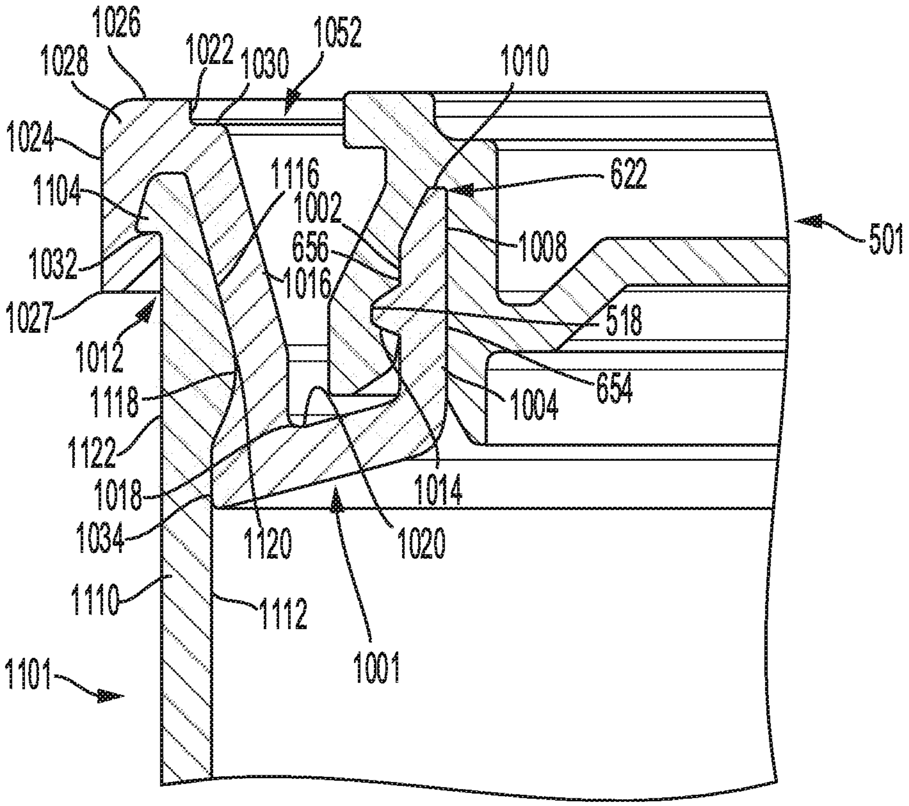
FIG. 15 is a cross-sectional view of an exemplary container ring, container, and container lid in an attached configuration, according to one embodiment of the present disclosure.

Now referring to FIG. 15, a cross-sectional view of an exemplary container ring, container 1101, and container lid 501 in an attached configuration is shown, according to one embodiment of the present disclosure. In various embodiments, the container 1101 includes an external wall 1110 with an outer surface 1122 and an inner surface 1112. In certain embodiments, the external wall 1110 of the container 1101 extends upward from the container bottom and transitions into a container rim 1104 at the upper end of the container 1101. In at least one embodiment, the container rim 1104 extends outward from the outer surface 1122 of the external wall 1110 to form a latch surface 1032 for engaging with the container ring 1001, as will be further discussed herein. In certain embodiments, and as shown in FIG. 15, the upper portion 1116 of the inner surface 1112 of the external wall 1110 protrudes out slightly from the external wall 1110 and establishes a generally semi-circular bead 1118. In one or more embodiments, the bead 1118 may have a radius less than 1 cm. In particular embodiments, the generally semi-circular bead 1118 transitions downward to an exterior floor surface 1034. In one or more embodiments, the exterior floor surface 1034 may be substantially parallel to the external wall 1110 of the container 1101.

In various embodiments, the container ring 1001 may include any of the seal structures discussed herein, including those discussed at FIGS. 2A, 2B, and 2C. In particular embodiments, the container ring 1001 includes a generally u-shaped channel 1052. In the embodiment shown in FIG. 15, the u-shaped channel 1052 (from a cross-sectional perspective) includes two sidewalls 1004, 1016 connected by a floor 1020 that generally slopes from the inner sidewall 1004 downwardly to the outer sidewall 1016, whereby the outer sidewall 1016 and the floor 1020 form a substantially rounded connection 1018. In certain embodiments, the floor 1020 may slope at an angle between forty-five and ninety degrees, preferably at an angle between forty-five and fifty degrees, relative to the outer sidewall 1016. In one or more embodiments, and as shown in FIG. 15, the distance between the inner sidewall 1004 and the outer sidewall 1016 may be any suitable distance (e.g., 0.8-1.2 cm, 4.8-5.2, cm, 9.8-10.2 cm, etc.).

As will be further discussed below, the inner sidewall 1004 includes seal surfaces 1002, 1008, and integrally formed protrusions (e.g., ring bead 1014) of the container ring 1000. In particular embodiments, the seal surfaces 1002, 1008 of the inner sidewall 1004 converge at an upper portion of the container ring 1001 into a substantially trapezoidal peak (e.g., top surface 1010), which fits into a corresponding trapezoidal cavity 622 on the container lid 501. In certain embodiments, the top surface 1010 (and the corresponding cavity on the container lid) may be substantially rectangular. In particular embodiments, top surface 1010 (and the corresponding cavity on the container lid) may be substantially rounded. In some embodiments, the inner sidewall 1004 may include a notch (not shown) on the seal surface 1008 for engaging with a corresponding notch on a container lid. In one embodiment, the seal surfaces 1002, 1008 may be composed of an elastomer. In another embodiment, the seal surfaces 1002, 1008 are composed of plastic. In various embodiments, and as shown in FIG. 15, the seal surfaces 1002, 1008 of the container ring 1001 are flush against the seal surfaces 654, 656 of the container lid 501 (including the trapezoidal cavity 622), such that a liquid-tight seal is facilitated.

Continuing with the embodiment shown in FIG. 15, the inner sidewall 1004 includes a ring bead 1014 (or other suitable protrusion) that protrudes into the u-shaped channel 1052 of the container ring 1001. In various embodiments, the ring bead 1014 may be substantially trapezoidal or substantially rounded in shape. In one or more embodiments, the ring bead 1014 (e.g., protrusion) engages with a corresponding seal structure on the container lid 501, such that a liquid-tight seal between the container ring 1001 and the container lid 501 may be formed. For example, in particular embodiments, the ring bead 1014 engages with a corresponding undercut 518 on the container lid, and, in combination with the seal surfaces 1002, 1008, facilitates a liquid-tight seal between the container ring 1000 and the lid 501. As will be understood from discussions herein, the inner sidewall 1004 is received within a generally u-shaped channel of a container lid 501, and the seal surfaces 1002, 1008 and ring bead 1014 help create a seal between the inner sidewall 1004 and the container lid 501, thereby sealing an interior/storage area of the container.

Further continuing with the embodiment shown in FIG. 15, the outer sidewall 1016 includes various components for engaging with, and sealing a container 1101. In certain embodiments, the outer sidewall 1016 may be substantially concave. In particular embodiments, the outer sidewall 1016 includes an upper portion 1028 that includes an aperture 1012, such that the upper portion 1028 of the outer sidewall 1016 is substantially hook-shaped. In at least one embodiment, and as shown in FIG. 15, the aperture 1012 engages with the container rim 1104, whereby the bead 1118 on the upper portion 1116 of the inner surface 1112 of the external wall 1110 is flush against the outer sidewall 1016 of the container ring 1001, such that a liquid-tight seal is formed. In particular embodiments, the apex 1120 of the bead 1118 on the upper portion 1116 of the inner surface 1112 of the external wall 1110 is flush with the outer sidewall 1016 of the container ring 1001. In these embodiments (and others), the exterior floor surface 1034 is flush against the inner surface 1112 or the external wall 1110 such that a liquid-tight seal is formed. In one or more embodiments, pressure exerted on the container lid 501 is transferred to the interface between the bead 1118 on the container 1101 and the hook and latch structure of the seal container ring 1001 and container 1101, such that sealing properties are increased.

In one or more embodiments, the upper portion 1028 of the outer sidewall 1016 includes a top surface 1026. In particular embodiments, the top surface 1026 is substantially flat and substantially parallel to the container bottom. In certain embodiments, the top surface 1026 transitions down to a secondary surface 1030 of the outer sidewall 1016 via a vertical wall 1022. In one or more embodiments, the top surface 1026 of the upper portion 1028 is at a higher elevation from the bottom of the container than the secondary surface 1030 of the outer sidewall 1016. In at least one embodiment, the secondary surface 1030 is substantially flat and substantially parallel to the container bottom.

In particular embodiments, the upper portion 1028 of the outer sidewall 1016 of the container ring 1001 includes a bottom surface 1027 that is substantially parallel to the top surface 1026. In some embodiments, the top surface 1026 and the bottom surface 1027 of the upper portion 1028 of the outer sidewall 1016 are integrally connected by an outer surface 1024 of the outer sidewall 1016. In some embodiments, the distance between the top surface 1026 of the upper portion 1028 and the bottom surface 1027 of the upper portion 1028 may be less than 30 mm.

In at least one embodiment, the top surface 1026 of the upper portion 1028 of the outer sidewall 1016 is at a first distance from the bottom surface of the container ring 1001, and the top surface 1010 of the inner sidewall 1004 (e.g., the trapezoidal peak) is at a second distance from the bottom surface of the container ring 1001, where the first distance is greater than the second distance. In particular embodiments, the "tiered elevation" of the top surface 1026 of the outer sidewall 1016 and the top surface 1010 of the inner sidewall 1004 (e.g., the trapezoidal peak) may help increase stability and load distribution when two (or more) containers 1101 and container rings 1001 are stacked together (e.g., for shipping, without lids), as portions of the container bottom may match the tiered elevation of the sidewalls 1004, 1016 of the container ring 1001.

Figure 16:
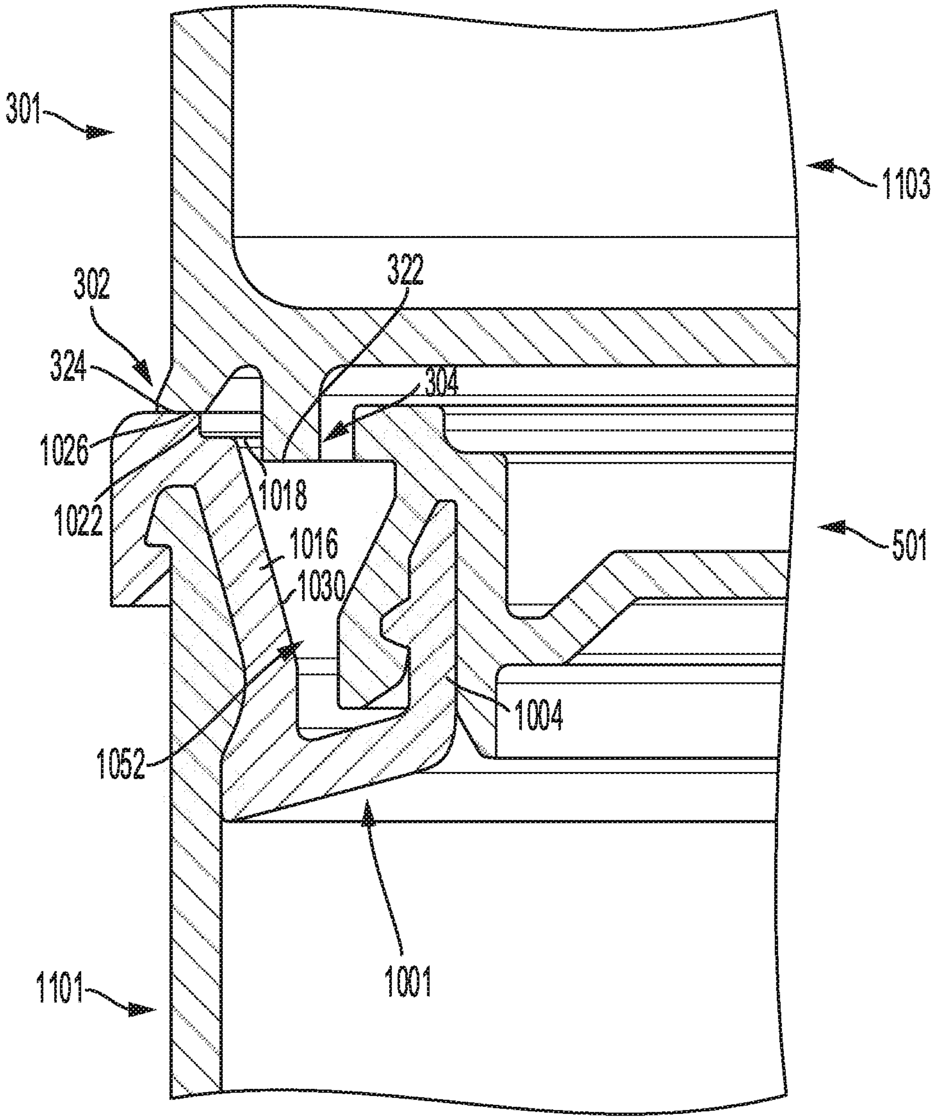
FIG. 16 is a cross sectional view of an exemplary container stacked on top of a container, container ring and container lid in an attached configuration, according to one embodiment of the present disclosure.

Turning now to FIG. 16, a cross sectional view of an exemplary container 1103 stacked on top of a container 1101, container ring 1001, and container lid 501 in an attached configuration is shown, according to one embodiment of the present disclosure. As shown in the present embodiment, a container bottom 301 sits on top of a container lid 501 engaged in a seal with a container ring 1001 attached to a container 1101. In various embodiments, the container bottom 301 includes legs 302, 304 to provide stability for the container 1103. In various embodiments, the upper leg 302 includes a base 324 and the lower leg 304 includes a base 322. In particular embodiments, the bases 322, 324 are substantially parallel to the container bottom and provide support when the container 1103 is rested on a surface.

In various embodiments, and as shown in FIG. 16, the substantially flat shape of the top surface 1026 of the outer sidewall 1016 provides a level surface for the base 324 of the upper leg 302 to rest upon. In these embodiments (and others), the lower leg 304 and the upper leg 302 may straddle the secondary surface 1030 of the outer sidewall 1016.

As discussed above, and shown in FIG. 16, the tiered elevation of the sidewalls 1004, 1016 of the container ring 1001 in combination with the vertical height of the lid 501, provides stability and load distribution when two (or more) containers 1101, 1103 with container rings 1001 attached are sealed with lids 501 and stacked together.

Conclusion

Accordingly, it will be readily understood by those persons skilled in the art that, in view of the above detailed description of the various embodiments and articles of the present disclosure, the present disclosure is susceptible of broad utility and application. Many methods, embodiments, and adaptations of the present disclosure other than those herein described, as well as many variations, modifications, and equivalent arrangements will be apparent from or reasonably suggested by the present disclosure and the above detailed description thereof, without departing from the substance or scope of the present disclosure. Accordingly, while the present disclosure is described herein in detail in relation to various embodiments, it is to be understood that this detailed description is only illustrative and exemplary of the present disclosure and is made for purposes of providing a full and enabling disclosure of the present disclosure. The detailed description set forth herein is not intended nor is to be construed to limit the present disclosure or otherwise to exclude any such other embodiments, adaptations, variations, modifications, and equivalent arrangements of the present disclosure. The scope of the present disclosure is defined solely by the claims appended hereto and the equivalents thereof.

What is claimed is:

1. A container comprising:

a seal structure configured to attach to a container body, the seal structure comprising:

an inner sidewall comprising:

a first seal surface having a vertical portion that extends in a direction substantially parallel to a central axis of the seal structure, the first seal surface being on a radially outward side of the inner sidewall;

a second seal surface that is substantially flat and is on a radially inward side of the inner sidewall; and a ring bead integrally formed with the first seal surface at an intermediate position along the vertical portion of the first seal surface such that (i) a first vertical section of the first seal surface extends between the ring bead and a terminal end of the first seal surface and (ii) a second vertical section of the first seal surface extends between the ring bead and a floor of the seal structure, the ring bead extending radially outward from the first seal surface for engaging with a corresponding structure on a container lid; and an outer sidewall positioned radially outward from the inner sidewall, the outer sidewall comprising:

an outer sidewall interior surface on a radially inward side of the outer sidewall;

an outer sidewall exterior surface on a radially outward side of the outer sidewall, the outer sidewall exterior surface being substantially parallel to the first seal surface and terminating at a container bead; and a top surface of the container bead substantially perpendicular to the outer sidewall exterior surface; and the floor extending between the inner sidewall and the outer sidewall, whereby a channel structure is defined at least in part by the first seal surface of the inner sidewall, the outer sidewall interior surface of the outer sidewall, and the floor, wherein:

the seal structure is configured to form a first seal with a container body and a second seal with the container lid when the container lid is in an attached configuration;

the floor has an upper floor surface located within the channel structure and a lower floor surface opposite the upper floor surface;

a first end of the lower floor surface transitions to a lower portion of the outer sidewall exterior surface via a first transition corner;

a second end of the lower floor surface transitions to a lower portion of the second seal surface of the inner sidewall via a second transition corner; and wherein the lower floor surface is a continuous linear surface from the first transition corner to the second transition corner, wherein the first transition corner is configured to abut an inner surface of the container, and wherein the second transition corner defines an opening of the container.

2. The container of claim 1, wherein the ring bead comprises an upper ring bead slope and a lower ring bead slope, the upper ring bead slope and lower ring bead slope culminating in a ring bead peak.

3. The container of claim 2, wherein the upper ring bead slope comprises a slope steeper than the lower ring bead slope.

4. The container of claim 1, wherein the top surface of the container bead slopes downwardly to form a protrusion extending inwardly from the outer sidewall interior surface toward the first seal surface.

5. The container of claim 4, wherein: the container bead comprises a bottom surface within a particular plane; and a peak of the protrusion extending inwardly from the outer sidewall interior surface is substantially in the particular plane.

6. The container of claim 1, wherein the first seal surface and the second seal surface converge at a seal surface peak.

7. The container of claim 1, wherein: the container comprises the container lid; and the container lid comprises a substantially u-shaped channel comprising a container lid undercut engaged with the ring bead.

8. The container of claim 1, wherein the outer sidewall exterior surface comprises a recessed portion for interfacing with a corresponding container bead of an interior container surface of an external wall of the container body when the seal structure is attached to the container body.

9. The container of claim 1, wherein the first end of the lower floor surface is coplanar with the second end of the lower floor surface.

10. The container of claim 9, wherein the first end of the lower floor surface, the second end of the lower floor surface, and an entirety of a middle portion of the lower floor surface are coplanar, the middle portion of the lower floor surface extend from the first end of the lower floor surface to the second end of the lower floor surface.

11. The container of claim 1, wherein the lower portion of the outer sidewall exterior surface is a lowermost portion of the outer sidewall exterior surface.

12. The container of claim 1, wherein the lower portion of the second seal surface is a lowermost portion of the second seal surface.

13. The container of claim 1, wherein the lower portion of the outer sidewall exterior surface is flat and vertical.

14. The container of claim 13, wherein the lower portion of the outer sidewall exterior surface is configured to abut a flat and vertical portion of an inner sidewall of the container body when the seal structure is attached to the container body.

15. The container of claim 1, wherein a location of the first end immediately adjacent to the first transition corner is at a height that is less than a height of a location of the second end that is immediately adjacent to the second transition corner.

16. The container of claim 15, wherein a lowermost portion of the seal structure comprises the first transition corner and the location of the first end immediately adjacent to the first transition corner.

17. The container of claim 1, wherein:

the outer sidewall interior surface has:

a first portion extending from a top of the outer sidewall interior surface to a transition point; and a second portion extending from the transition point to an interior transition corner separating the second portion from the upper floor surface;

the first portion slopes upward in a radially outward direction; and the second portion is vertical.

18. The container of claim 1, wherein:

the upper floor surface transitions to the outer sidewall interior surface via a first interior corner and transitions to the first seal surface of the sidewall via a second interior corner;

the upper floor surface extends from the first interior corner to the second interior corner along a single plane.

19. The container of claim 18, wherein the single plane is sloped downwardly in a radially outward direction.

* * * * *